(12) United States Patent
Masaki et al.

(10) Patent No.: US 6,526,014 B2
(45) Date of Patent: Feb. 25, 2003

(54) OPTICAL STORAGE APPARATUS

(75) Inventors: Takashi Masaki, Kawasaki (JP);
Shigenori Yanagi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/898,930

(22) Filed: Jul. 2, 2001

(65) Prior Publication Data

US 2002/0036962 A1 Mar. 28, 2002

Related U.S. Application Data

(62) Division of application No. 09/027,260, filed on Feb. 20, 1998, now Pat. No. 6,275,462.

(30) Foreign Application Priority Data

Aug. 28, 1997 (JP) .............................................. 9-232160

(51) Int. Cl.⁷ .............................................. G11B 15/52
(52) U.S. Cl. ................................... 369/47.53; 369/116
(58) Field of Search ............................ 369/116, 47.53, 369/47.55

(56) References Cited

U.S. PATENT DOCUMENTS

| | | | |
|---|---|---|---|
| 5,305,296 A | 4/1994 | Kono | 369/50 |
| 5,513,166 A | * 4/1996 | Tokumitsu et al. | 369/116 |
| 5,602,814 A | 2/1997 | Jaquette et al. | 369/58 |
| 5,726,954 A | * 3/1998 | Matsumoto et al. | 369/116 |
| 5,796,704 A | 8/1998 | Nanba et al. | 369/116 |
| 5,872,763 A | 2/1999 | Osakabe | 369/116 |
| 5,920,534 A | 7/1999 | Furuta et al. | 369/59 |
| 5,936,924 A | 8/1999 | Tanaka | 369/58 |
| 5,956,295 A | 9/1999 | Yamakawa et al. | 369/13 |
| 5,974,021 A | 10/1999 | Toda et al. | 369/116 |
| 6,111,841 A | * 8/2000 | Iida et al. | 369/116 |
| 6,246,661 B1 | * 6/2001 | Toda et al. | 369/116 |

FOREIGN PATENT DOCUMENTS

| | | |
|---|---|---|
| EP | 0 491 301 A1 | 6/1992 |
| EP | 0 878 797 A1 | 11/1998 |
| EP | 0 944 051 A2 | 9/1999 |
| JP | 8-045101 | 2/1916 |
| JP | 62-159347 | 7/1987 |
| JP | 641-033777 | 2/1989 |
| JP | 1-196767 | 8/1989 |
| JP | 1-196769 | 8/1989 |
| JP | 5-012669 | 1/1993 |
| JP | 6-036327 | 2/1994 |
| JP | 6-309669 | 11/1994 |
| JP | 6-318322 | 11/1994 |
| JP | 8-153348 | 6/1996 |
| JP | 8-329468 | 12/1996 |
| JP | 63-271735 | 11/1998 |

* cited by examiner

Primary Examiner—Nabil Hindi
(74) Attorney, Agent, or Firm—Greer, Burns & Crain, Ltd.

(57) ABSTRACT

A division test write processing unit is provided and a test writing process for deciding an optimum light emitting power by executing a test writing on a medium is divided into a plurality of division test writing processes. When an upper command is received, in the division test write processing unit, a division control unit skips to a division executing unit locating at the head of the processes which are not yet executed among a plurality of division executing units and allows the dividing processes of the test writing to be executed for a predetermined time.

20 Claims, 24 Drawing Sheets

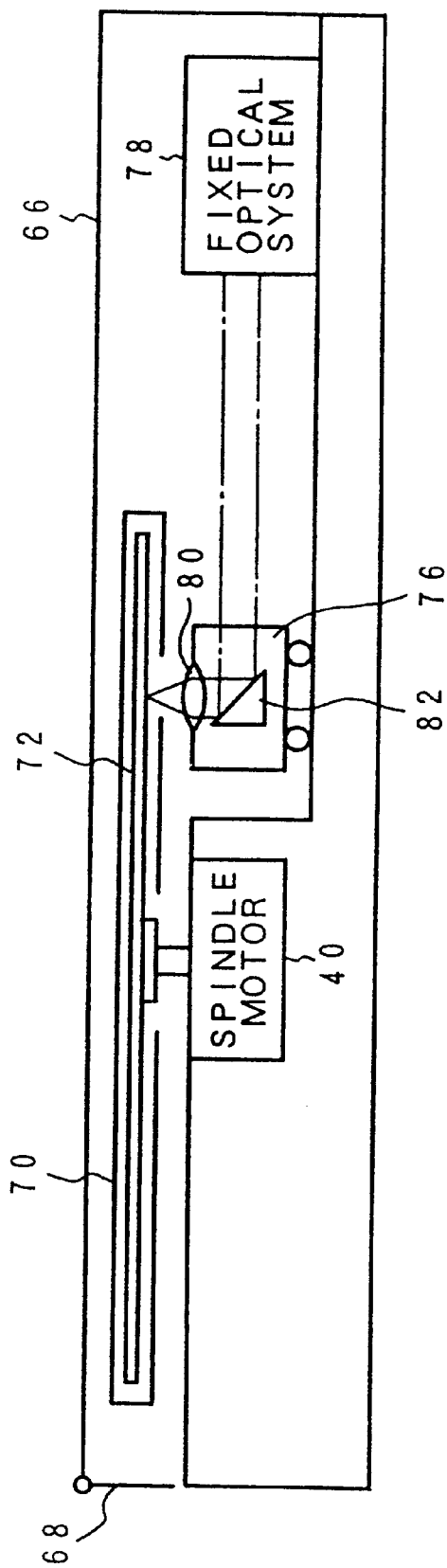

FIG. 4A WRITE GATE
FIG. 4B WRITE DATA
FIG. 4C WRITE CLOCK
FIG. 4D PULSE WIDTH DATA
FIG. 4E ASSIST PULSE (FOR AP)
FIG. 4F FIRST WRITE PULSE (FOR WP1)
FIG. 4G SECOND WRITE PULSE (FOR WP2)
FIG. 4H LIGHT EMISSION CURRENT /POWER
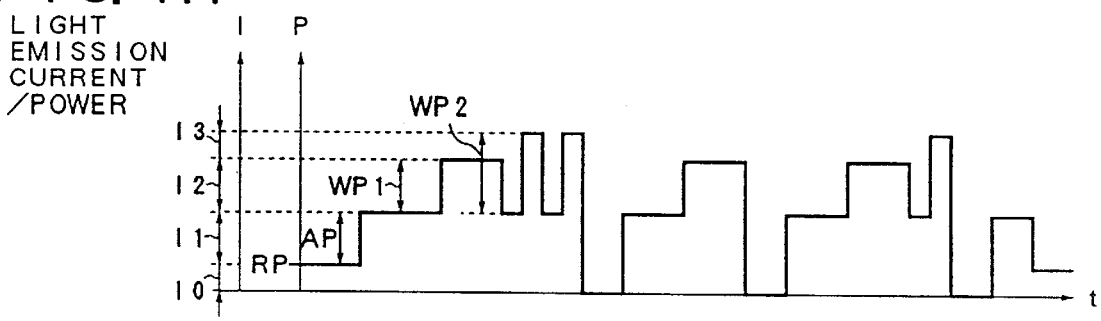
FIG. 4I SUBTRACTION CURRENT
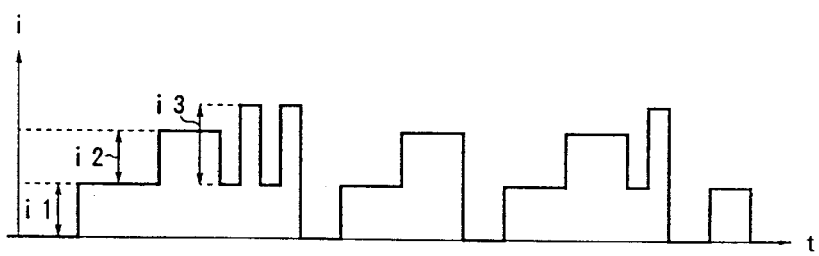
FIG. 4J MONITOR CURRENT im {i0−(i1+i2+i3)}
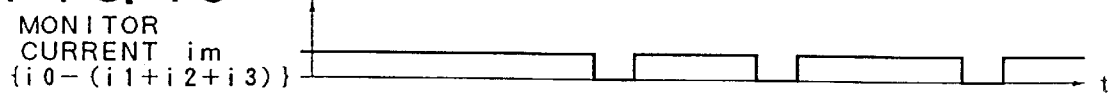

FIG. 5A WRITE GATE 
FIG. 5B WRITE DATA 
FIG. 5C WRITE CLOCK 
FIG. 5D PULSE WIDTH DATA 
FIG. 5E ASSIST PULSE (FOR AP) 
FIG. 5F FIRST WRITE PULSE (FOR WP1) 
FIG. 5G SECOND WRITE PULSE (FOR WP2) 
FIG. 5H LIGHT EMISSION CURRENT 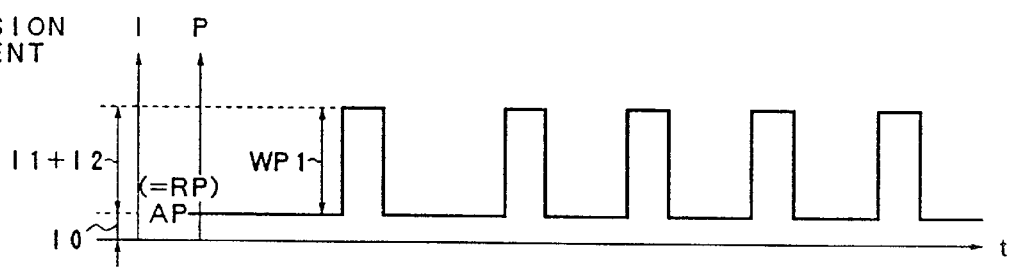
FIG. 5I SUBTRACTION CURRENT 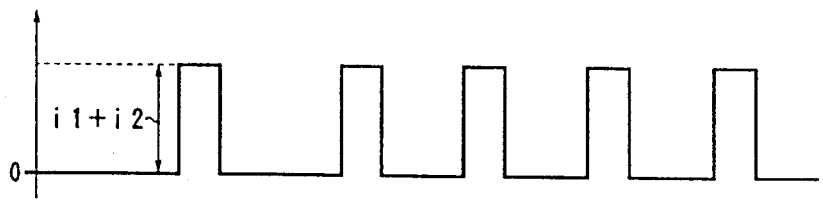
FIG. 5J MONITOR CURRENT im (=i0−(i1+i2)) 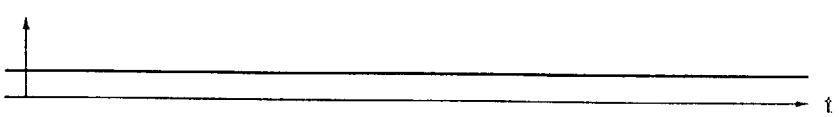

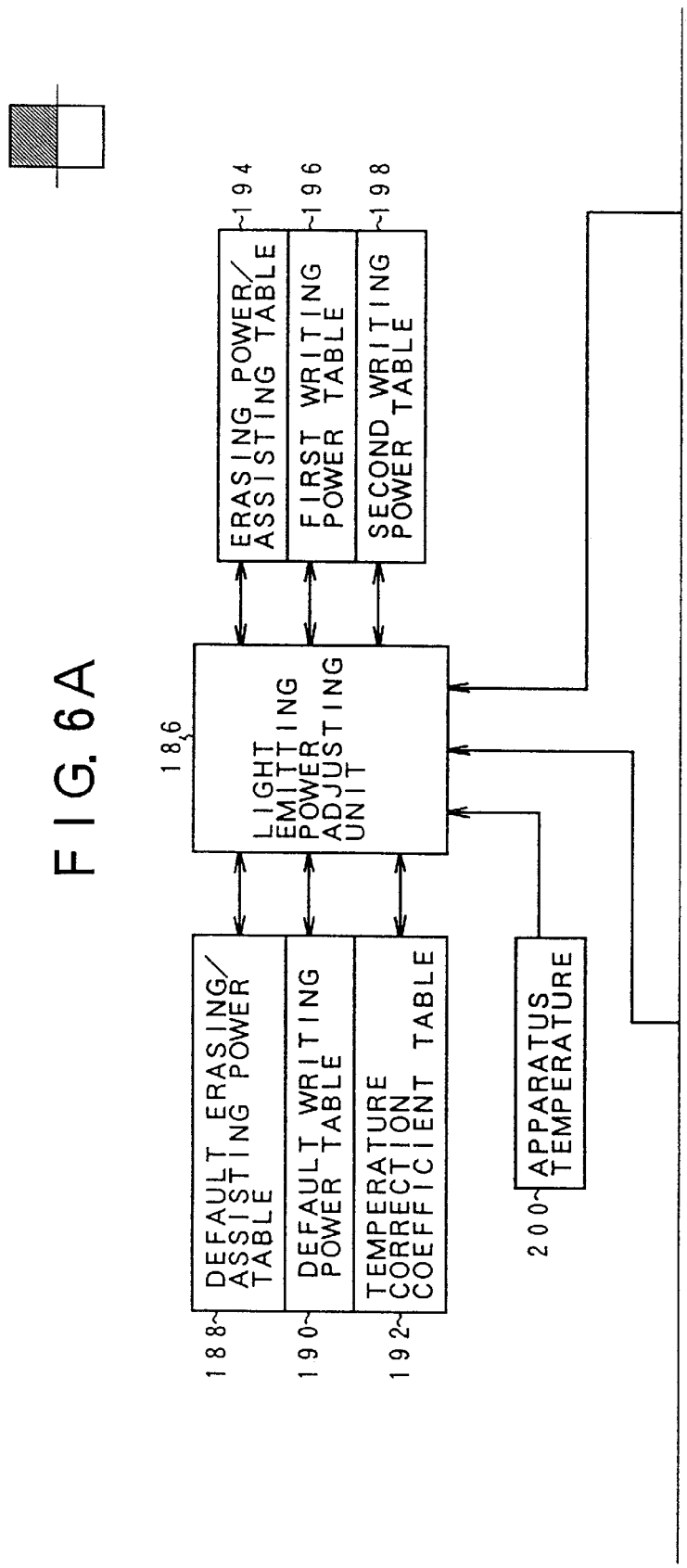

FIG. 8

| ELAPSED TIME (sec) | VALID TIME Tv (sec) |
|---|---|
| 0~19 | 20 |
| 20~39 | 40 |
| 40~59 | 80 |
| 60~160 | 160 |

190

| AREA | ZONE No. i | DWP i |
|---|---|---|
| INNER RIM AREA | 1 | 6.0 mW |
| | 2 | 6.5 mW |
| | 3 | 7.0 mW |
| | 4 | 7.5 mW |
| INTERMEDIATE AREA | 5 | 8.0 mW |
| | 6 | 8.5 mW |
| | 7 | 9.0 mW |
| | 8 | 9.5 mW |
| OUTER RIM AREA | 9 | 10.0 mW |
| | 10 | 10.5 mW |
| | 11 | 11.0 mW |

192

| AREA | ZONE No. i | Kt |
|---|---|---|
| INNER RIM AREA | 1 | −0.10 |
| | 2 | −0.08 |
| | 3 | −0.06 |
| | 4 | −0.04 |
| INTERMEDIATE AREA | 5 | −0.02 |
| | 6 | 0.00 |
| | 7 | 0.02 |
| | 8 | 0.04 |
| OUTER RIM AREA | 9 | 0.06 |
| | 10 | 0.08 |
| | 11 | 0.10 |

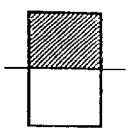
F I G. 1 5 A
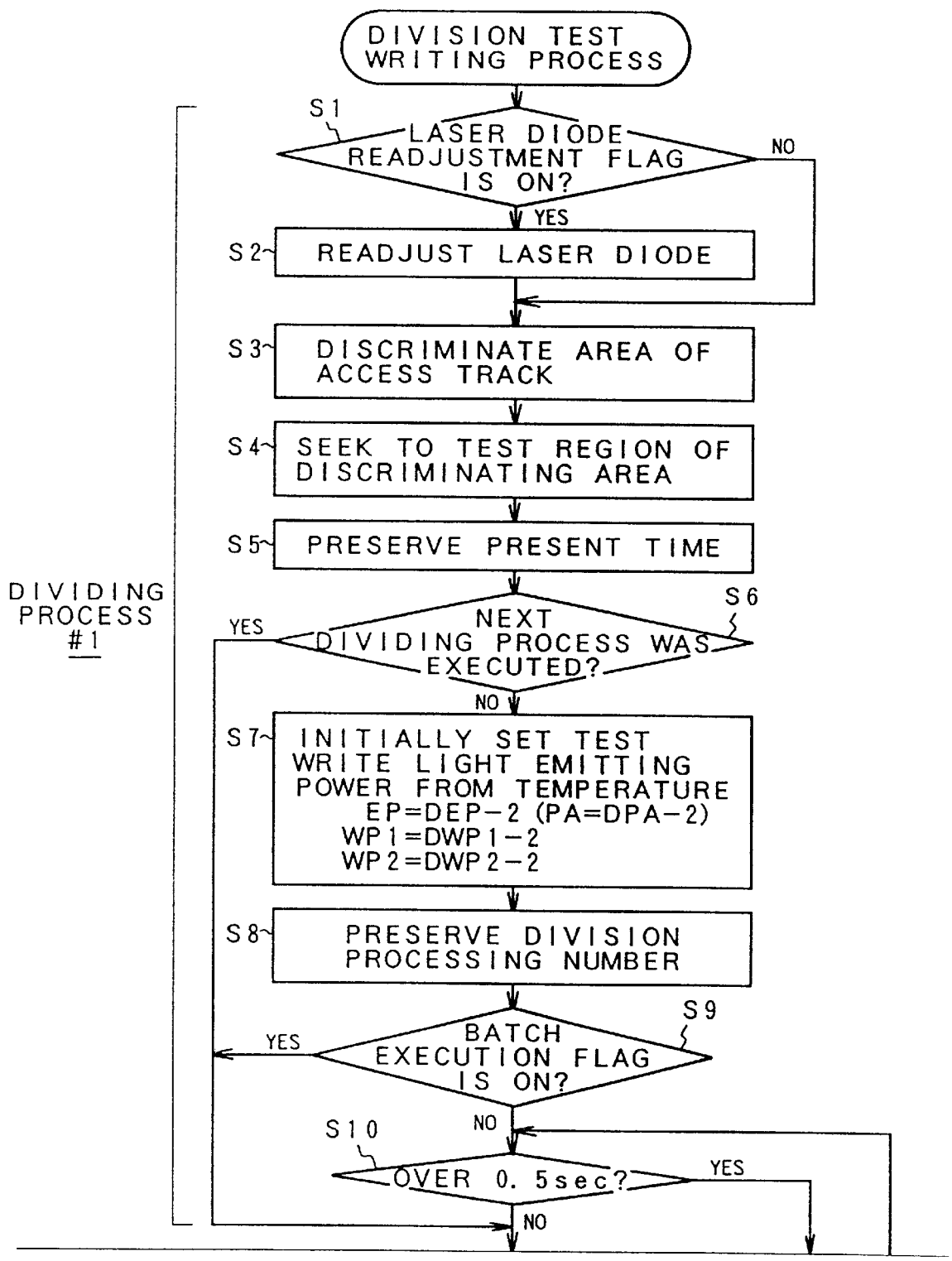

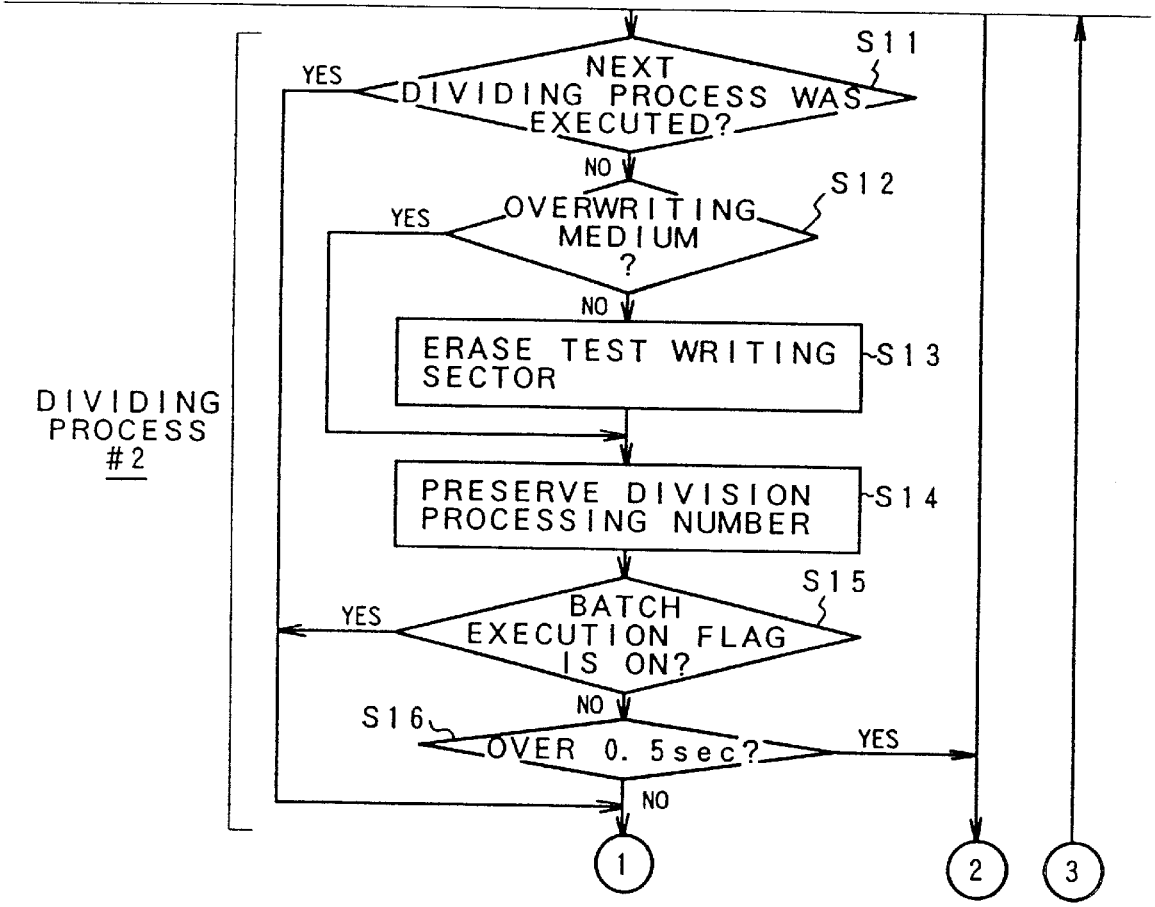

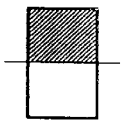
FIG. 18A
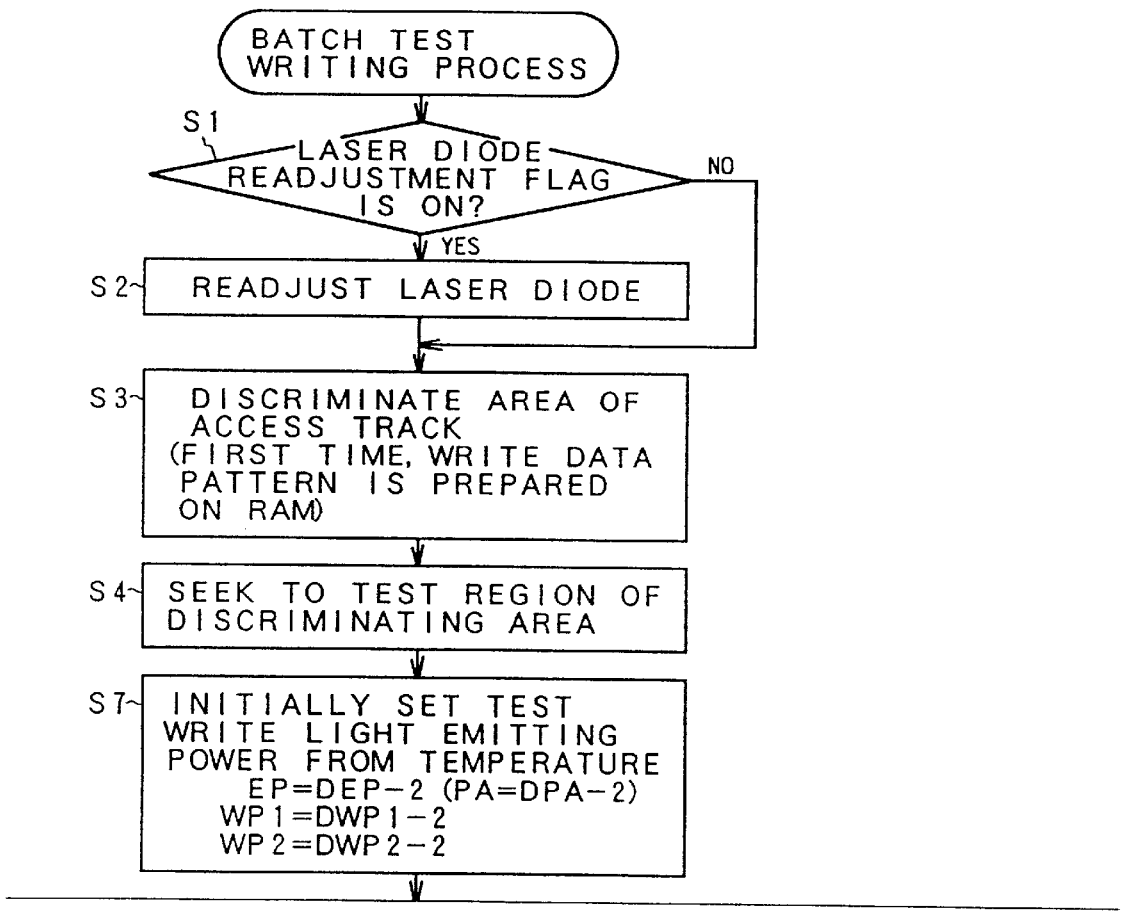

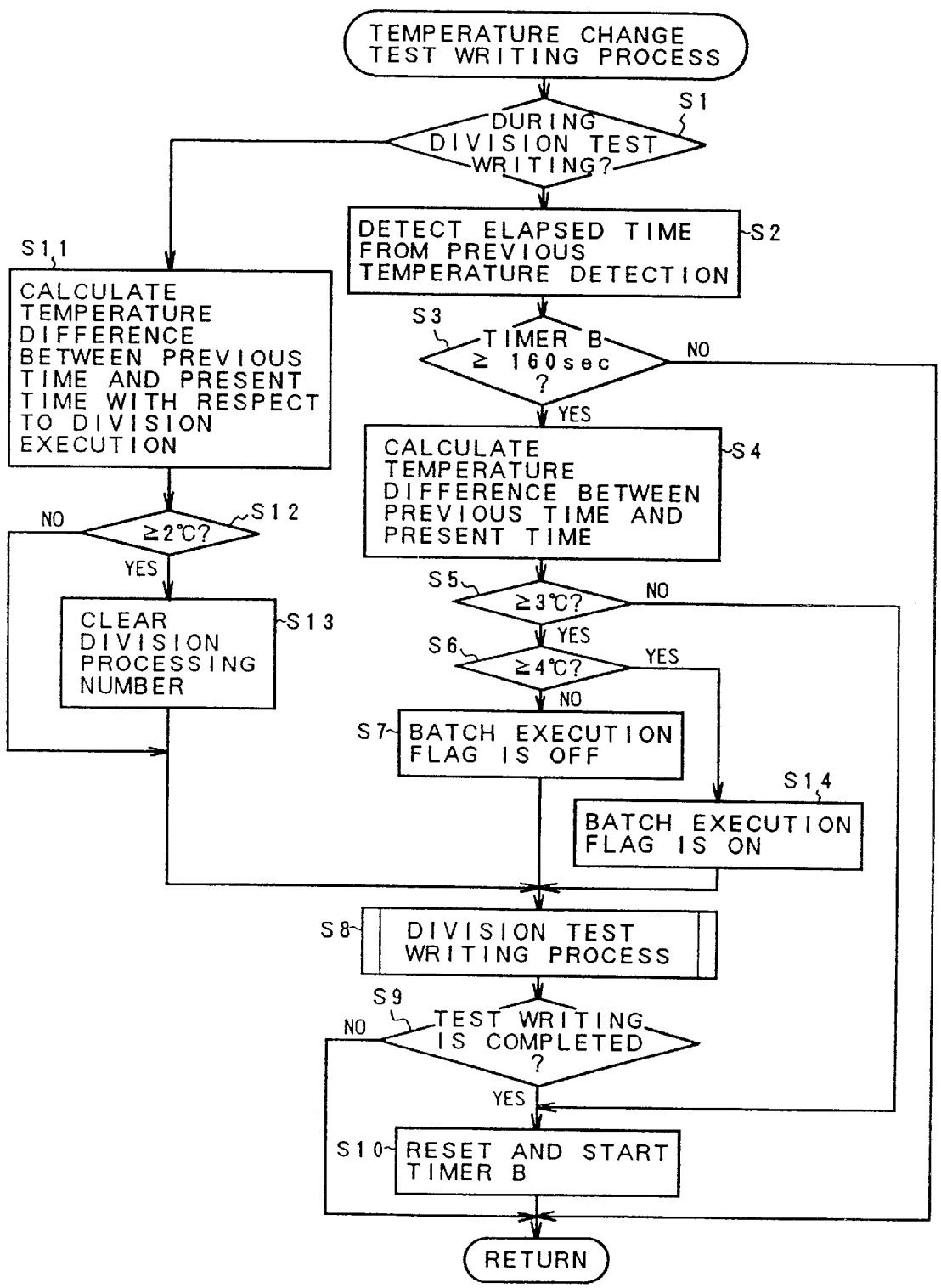

OPTICAL STORAGE APPARATUS

This is a division of application Ser. No. 09/027,260, filed Feb. 20, 1998, now U.S. Pat. No. 6,275,462.

BACKGROUND OF THE INVENTION

The invention relates to an optical storage apparatus using a removable medium such as magnetooptical cartridge, phase-change type optical disk, DVD-RAM, or the like and, more particularly, to an optical storage apparatus for executing an access of a command while deciding an optimum light emitting power by a test writing on a medium when receiving a host command.

An optical disk has been highlighted as a storage medium serving as a core of multimedia which has rapidly been developed in recent years. For example, in case of an MO cartridge of 3.5 inches, in addition to conventional medium of 128 MB, medium of a high-density recording of 540 MB or 640 MB has also been being presented in recent years. In the MO cartridge which is used in an optical disk drive, a ZCAV recording (zone constant angular velocity recording) in which a medium track is divided into zones and the number of sectors is set to be equal every zone is used. The medium of 128 MB uses the recording method of a pit position modulation (PPM). It is sufficient that the light emitting power changes at three stages of a reading power, an erasing power, and a recording power. On the other hand, the media of 230 MB, 540 MB, and 640 MB use the recording method of a pulse width modulation (PWM) in order to raise a recording density. In the PWM recording, it is necessary to change the light emitting power at four stages of the reading power, the erasing power, a first writing power, and a second writing power. In the PWM recording of a medium of a direct overwrite corresponding type which doesn't need the erasing operation, it is necessary to change the light emitting power at four stages of the reading power, an assisting power, the first writing power, and the second writing power.

However, in the recording medium of a high density such as 540 MB or 640 MB in which the PWM recording is performed, a margin of an optimum writing power of a laser diode which is used for medium recording is narrow. When a temperature of the medium changes, the optimum writing power changes. The optimum writing power also changes depending on manufacturing conditions of the medium or a difference of writing performance of the optical disk drive. That is, in case of recording by a predetermined writing power which was unconditionally determined at a designing stage, the writing power largely deviates from the actual optimum writing power and a case where the recording operation cannot be executed occurs, so that there is a problem that writing and reading performance deteriorates.

SUMMARY OF THE INVENTION

According to the invention, there is provided an optical storage apparatus constructed in a manner such that even when there is a difference of performance of apparatuses or manufacturing conditions of media or when an apparatus temperature changes, an optimum writing power can always be set and, further, even when it takes a long time for a process to set the optimum power, an error due to a time-out doesn't occur for an upper apparatus.

An optical storage apparatus of the invention comprises: a tight emitting power adjusting unit for adjusting a light emitting power of a laser diode which is used for recording and reproduction of a medium; and a division test writing processing unit for dividing a test writing process to an optimum light emitting power by executing a test writing on the medium into a plurality of processes and for sequentially executing the divided processes each time an upper command is received. By the division test writing process as mentioned above, a series of test writing processes accompanied with the erasing, writing, and reading operations (in the direct overwrite corresponding type medium which doesn't need the erasing operation, the test writing process for writing and reading) when the upper command is received are divided into a plurality of processing stages and are sequentially executed. Even when the apparatus temperature rapidly changes and the optimum power remarkably deviates from the default power which has initially been set and it takes a long time up to the end of the test writing operation to find the optimum power, since the processes are distributed and executed, a time-out for the upper command doesn't occur and the recording and reproducing operations can be executed as much as possible even when the power is deviated from the optimum power, so that the apparatus performance is improved.

An optical storage apparatus of the invention comprises: a light emitting power adjusting unit for adjusting a light emitting power of a laser diode which is used for recording and reproduction of a medium; and a division test writing processing unit for dividing a test writing, process to determine an optimum light emitting power by executing a test writing on the medium into a plurality of processes and for sequentially executing the divided processes each time an upper command is received. By the division test writing process as mentioned above, a series of test writing processes accompanied with the erasing, writing, and reading operations (in the direct overwrite corresponding type medium which doesn't need the erasing operation, the test writing process for writing and reading) when the upper command is received are divided into a plurality of processing stages and are sequentially executed. Even when the apparatus temperature rapidly changes and the optimum power remarkably deviates from the default power which has initially been set and it takes a long time up to the end of the test writing operation to find the optimum power, since the processes are distributed and executed, a time-out for the upper command doesn't occur and the recording and reproducing operations can be executed as much as possible even when the power is deviated from the optimum power, so that the apparatus performance is improved.

The division test writing processing unit comprises a division executing unit and a division control unit. The division executing unit divides the test writing process into a plurality of processes and executes. When receiving the upper command, the division control unit discriminates about the necessity of the test writing. When it is determined that the test writing is needed, the division control unit skips to the head of the unexecuted processes in the division executing unit and allows the dividing process of the test writing operation to be executed for a predetermined time. Each time one of the division executing processes is finished, the division control unit preserves the processed number and a processing result. When the elapsed time from the start of the dividing process is shorter than a predetermined time, the processing routine advances to the next dividing process. When a predetermined time elapses, the division control unit interrupts the processes and waits for a next upper command. When the elapsed time from the preceding dividing process by the division executing unit to the present dividing process is longer than a predetermined time, the division control unit cancels the processed numbers and processing results of up to the preceding time and again executes the dividing processes from the beginning. When the interrupting time of the dividing process becomes too long, there is a case where the optimum power fluctuates due to the temperature change or the like during the interrupting time. In this case, a more accurate optimum power is found by again executing the processes from the beginning.

For example, the division executing unit is constructed by:

a first division executing unit for setting a predetermined initial light emitting power (default value) at the first time and for setting a light emitting power obtained by changing the initial light emitting power by every predetermined value at the next and subsequent times;

a second division executing unit for erasing a test area of a medium by the set light emitting power;

a third division executing unit for writing a predetermined test pattern into the erased test area;

a fourth division executing unit for reading out the test pattern written in the test area; and a fifth division executing unit for deciding the number of times of data dissidence (error rate) by comparing the test pattern with the read-out pattern and for calculating the optimum light emitting power on the basis of the number of times of dissidence obtained by the test writing operations of a plurality of times by the first to fourth division executing units.

In this instance, as for the medium of the direct overwrite corresponding type which doesn't need the erasing operation, the division executing unit is constructed by:

a first division executing unit for setting a predetermined initial light emitting power (default value) at the first time and for setting a light emitting power obtained by changing the initial light emitting power by every predetermined value at the next and subsequent times;

a third division executing unit for writing a predetermined test pattern into a test area;

a fourth division executing unit for reading out the test pattern written in the test area; and a fifth division executing unit for determining the number of times of data dissidence (error rate) by comparing the test pattern with the read-out pattern and for calculating an optimum light emitting power on the basis of the number of times of dissidence obtained by the test writing operations of a plurality of times by the first to fourth division executing units.

The division control unit has an-elapsed time control unit for controlling by discriminating whether the division test writing process is performed or not on the basis of the elapsed time from a predetermined start timing of the apparatus. In this instance, as a start timing, in addition to the timing when the medium is loaded into the apparatus, a recovery timing from a sleeping mode in which a servo unit and a spindle motor are stopped, and the like are also included. The elapsed time control unit effectively operates for a period of time until the elapsed time from the start timing such as a loading of the medium or the like reaches a predetermined time, thereby controlling a plurality of division executing units. That is, a temperature in the apparatus rapidly rises and a distribution of the internal temperatures becomes fairly uneven for a period of time until about two to three minutes elapse after the medium was loaded in association with the power-on of the apparatus, so that the apparatus is in a state in which a detection value of the temperature sensor cannot be guaranteed. Therefore, the necessity of the test writing is discriminated on the basis of the elapsed time in a manner such that when the elapsed time from the medium loading is short, the test writing is executed at a high frequency and, when the elapsed time becomes long and the temperature becomes stable, the frequency of the test writing is reduced. That is, the elapsed time control unit decides the optimum light emitting power by executing a plurality of test writing processes in a lump by the first upper command and also sets a valid time Tv when it is unnecessary to adjust the optimum light emitting power on the basis of the elapsed time at that time. After the first time, the elapsed time control unit inhibits a division test writing for the upper command until a predetermined rate time of the valid time Tv elapses, and executes the division test writing in response to the upper command for a period of time until the valid time Tv from the predetermined rate time. The elapsed time control unit sets the valid time Tv so as to be gradually extended in proportion to the elapsed time after the start timing. The elapsed time control unit inhibits the division test writing for a time zone that is shorter than, for example, 90% of the valid time and permits the division test writing for a time zone exceeding 90% of the valid time. When the elapsed time exceeds the valid time Tv during the executing stage of the division test writing, since there is a possibility that the optimum power is remarkably deviated, the elapsed time control unit executes the remaining division test writing in a lump by a next upper command in this case.

On the other hand, the division control unit has a temperature change control unit for controlling by discriminating whether the division test writing process is executed or not on the basis of a change in apparatus temperature. The temperature change control unit operates after that a predetermined time during which the elapsed time control unit operates, for example, 160 seconds elapses from the start timing of the apparatus and the temperature in the apparatus became stable. The temperature change control unit detects the temperature in the apparatus every predetermined time and, when a temperature difference between the preceding detection temperature and the present temperature exceeds a predetermined temperature, for example, 3° C., allows the dividing process to be executed. When the temperature difference exceeds an upper limit temperature, for example, 4° C. that is higher than a predetermined temperature of 3° C., during the interruption of the dividing process, there is a possibility that the optimum power largely changes. Therefore, in this case, the temperature change control unit allows the division executing unit to execute the dividing processes in a lump. When the temperature difference between the preceding and present dividing processes exceeds a predetermined temperature, for example, 2° C. during the dividing processes by the division executing unit, there is a possibility that the interrupting time in the dividing state is too long and the optimum power remarkably changes. Therefore, the temperature change control unit cancels the processed numbers and processing results up to the preceding time and again executes the dividing processes from the beginning.

According to the invention, a medium is divided into a plurality of areas in the radial direction, for example, into an inner rim area, an intermediate area, and an outer rim area and the processes by the division test writing processing unit and the division control unit are independently executed every area. This is because the CAV is used for the rotation control of the medium and peripheral speeds in the radial direction of the medium differ, so that laser powers for heating the medium also differ. Therefore, the optimum power of each area is found by dividing the medium into, for example, three areas and independently executing the division writing test every area. Since the medium is divided into a plurality of zones in the radial direction, a plurality of zones are divided into groups every plurality zones in the radial direction, thereby dividing into a plurality of areas. The processes by the division test writing processing unit and the division control unit are independently executed every area.

Further, according to another embodiment of the invention, it is also possible to sequentially execute the division test writing processes by the division test writing processing unit in accordance with a predetermined time schedule of an elapsed time without depending on an upper command. When a temperature change of a predetermined value or more occurs, it is also possible to sequentially execute the division test writing processes by the division test writing processing unit without depending on the upper command.

The above and other objects, features, and advantages of the present invention will become more apparent from the following detailed description with reference to the drawings.

BRIEF DESCRIPTION OF THE DRAWINGS

FIG. 2 is an explanatory diagram of an internal structure of an apparatus in which an MO cartridge has been loaded;

FIGS. 4A to 4J are time charts of signals, light emission currents, subtraction currents, and a monitor current by the PWM recording of the invention in a medium of a direct overwrite corresponding type;

FIGS. 5A to 5J are time charts of signals, light emission currents, subtraction currents, and a monitor current by the PPM recording of the invention in the medium of the direct overwrite corresponding type;

FIGS. 6A and 6B are functional block diagrams of a test writing process of the invention which is realized by an MPU in FIG. 1;

FIG. 8 is an explanatory diagram of a valid time setting table which is used for the test writing process of the invention;

FIGS. 15A and 15B are detailed flowcharts for the division test writing process in FIG. 14;

FIGS. 18A and 18B are flowcharts for a batch test writing process shown by extracting a processing portion in a case where a batch execution flag is turned on in the division test writing process of FIGS. 15A, 15B, 16A, and 16B; and FIG. 19 is a flowchart for a temperature change test writing process to discriminate the necessity of the test writing on the basis of a temperature change in FIG. 13.

DETAILED DESCRIPTION OF THE PREFERRED EMBODIMENT

[Apparatus construction]

Figure 1A:
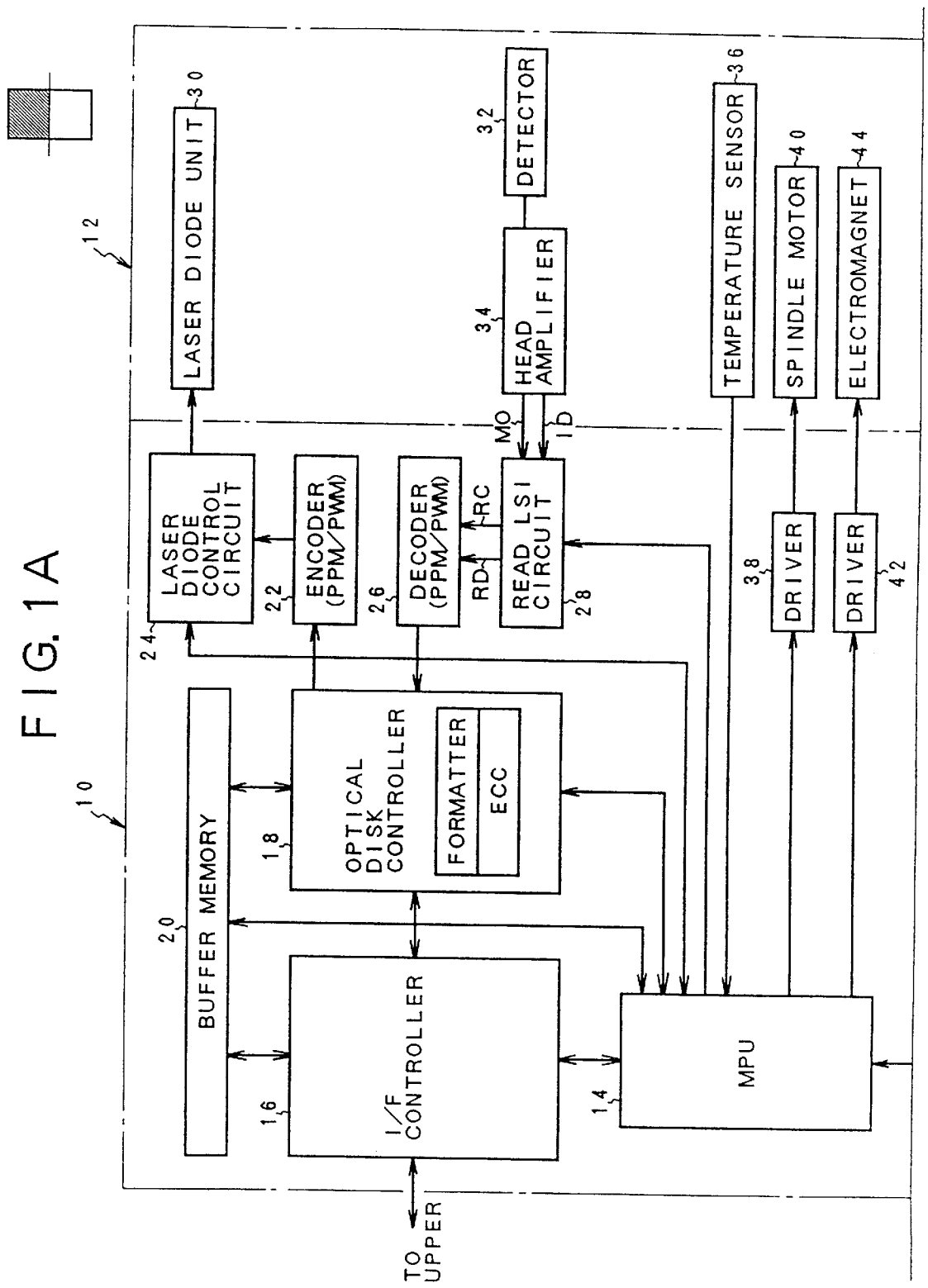
FIGS. 1A and 1B are block diagrams of an optical disk drive according to the invention.
Figure 1B:
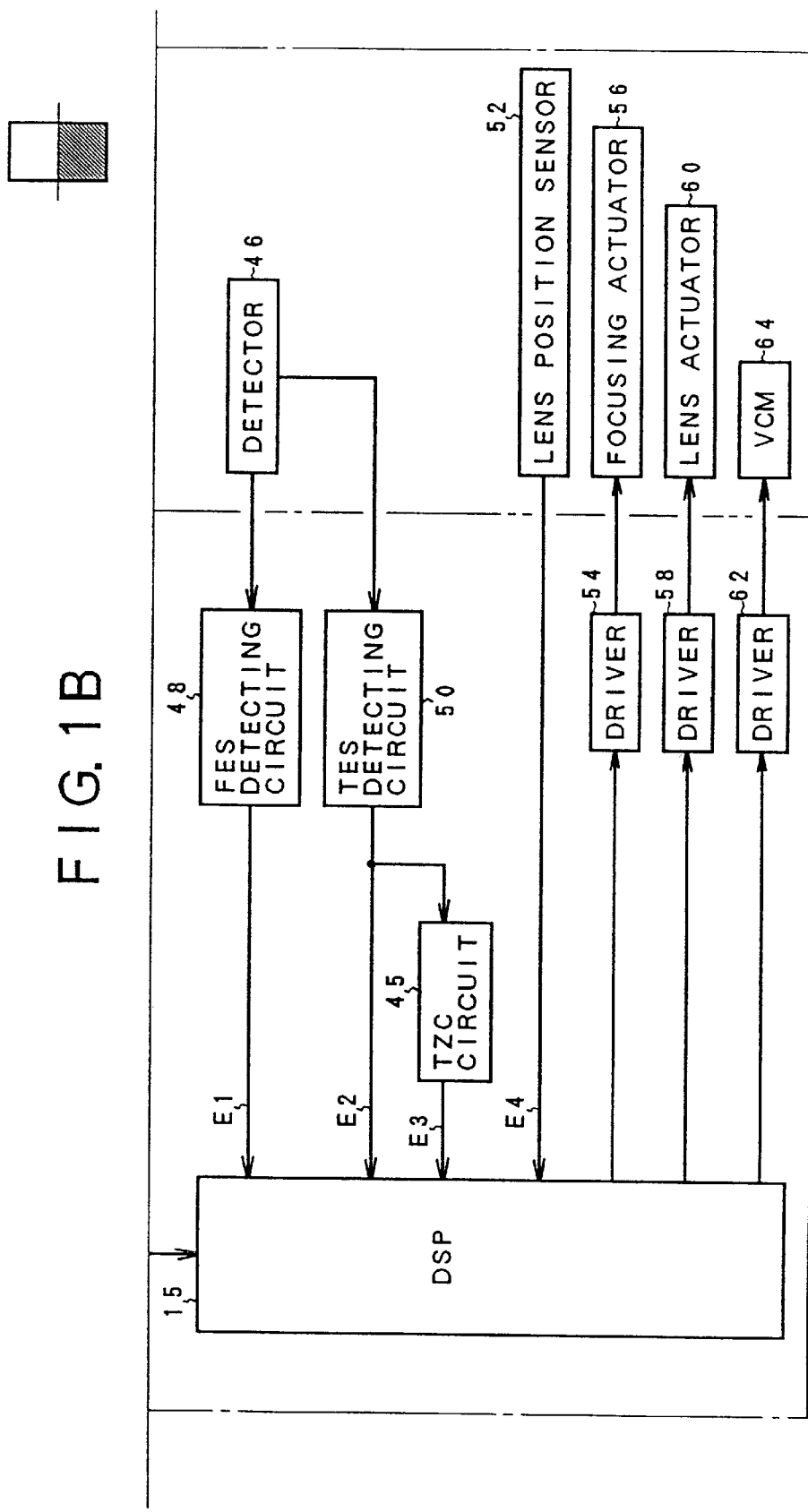

FIGS. 1A and 1B are circuit block diagrams of an optical disk drive as an optical storage apparatus of the invention. The optical disk drive of the invention is constructed by a control unit 10 and an enclosure 12. The control unit 10 has: an MPU 14 for executing a whole control of the optical disk drive; an interface controller 16 for transmitting and receiving commands and data to/from an upper apparatus; an optical disk controller (ODC) 18 having functions of a formatter and an ECC which-are necessary to read and write data from/to an optical disk medium; and a buffer memory 20. An encoder 22 and a laser diode control circuit 24 are provided as a writing system for the optical disk controller 18. A control output of the laser diode control circuit 24 is supplied to a laser diode unit 30 provided on the enclosure 12 side. The laser diode unit 30 integratedly has a laser diode and a photosensing device for monitoring. As an optical disk for recording and reproducing by using the laser diode unit 30, that is, as a removable MO cartridge medium, any one of MO cartridge media of 128 MB, 230 MB, 540 MB, and 640 MB and, further, direct overwrite corresponding type media of 540 MB and 640 MB can be used in the embodiment. With respect to the MO cartridge medium of 128 MB among them, a pit position recording (PPM recording) for recording data in correspondence to the presence or absence of a mark on the medium is used. A recording format of the medium is based on ZCAV and is set to one zone in case of the 128 MB medium and to ten zones in case of the 230 MB medium. On the other hand, with respect to the MO cartridge media of 230 MB, 540 MB, and 640 MB, a pulse width recording (PWM recording) in which edges of a mark, namely, front and rear edges of a mark are made correspond to data is used. The PWM recording is also called a mark recording or an edge recording. A difference between the storage capacities of 640 MB and 540 MB is caused by a difference of sector capacities. When the sector capacity is equal to 2 kB, the storage capacity is equal to 640 MB. On the other hand, when the sector capacity is equal to 512 B, the storage capacity is equal to 540 MB. The recording format of the medium is based on the ZCAV and is set to 10 zones in case of the 230-MB medium, 11 zones in case of the 640-MB medium, and 18 zones in case of the 540-MB medium. As mentioned above, the optical disk drive of the invention can cope with the MO cartridges having the storage capacities of 128 MB, 230 MB, 540 MB, and 640 MB and, further, the medium cartridges of the direct overwrite corresponding type. When an MO cartridge is loaded into the optical disk drive, therefore, an ID region of the medium is first read, the kind of medium is recognized by the MPU 14 from the pit interval, and the recognition result is notified to the optical disk controller 18. Consequently, in case of the medium of 128 MB or 230 MB, a formatting process corresponding to the PPM recording is executed. In case of the medium of 540 MB or 640 MB, a formatting process according to the PWM recording is executed.

As a reading system for the optical disk controller 18, a decoder 26 and a read LSI circuit 28 are provided. A photosensing signal of a return light of a beam from the laser diode 30 received by a detector 32 provided for the enclosure 12 is inputted as an ID signal and an MO signal to the read LSI circuit 28 via a head amplifier 34. The read LSI circuit 28 has circuit functions of an AGC circuit, a filter, a sector mark detecting circuit, a synthesizer, a PLL, and the like. The read LSI circuit 28 forms a read clock and read data from the inputted ID signal and MO signal and outputs them to the decoder 26. Since the zone CAV is used as a recording method of the medium by a spindle motor 40, a switching control of a clock frequency corresponding to a zone is executed for the synthesizer built in the read LSI circuit 28 by the MPU 14. The modulation of the encoder 22 and the demodulation of the decoder 26 are switched to the modulation and demodulation of the PPM recording in case of the media of 128 MB and 230 MB in accordance with the medium kind recognized by the optical disk controller 18. They are switched to the modulation and demodulation of the PWM recording in case of the media of 540 MB and 640 MB. A detection signal of a temperature sensor 36 provided on the enclosure 12 side is supplied to the MPU 14. On the basis of an environment temperature in the apparatus detected by the temperature sensor 36, the MPU 14 controls each of the light emitting powers for reading, writing, and erasing in the laser diode control circuit 24 to an optimum value. As a control for optimizing the light emitting powers, in the invention, there is executed a test writing such that when an upper write command is received with respect to the 540-MB and 640-MB media, a test pattern is written into a test region of the medium and, after that, the test pattern is read out, and the optimum light emitting power is found while discriminating the number of errors. According to the invention, there is executed a division test writing such that a test writing is divided every group of steps, when the upper write command is received, diving processes are sequentially executed, when an executing time exceeds a predetermined time, the dividing processes are interrupted, and when the upper write command is subsequently received, the dividing process of the test writing is executed from the interrupted step. Further, the MPU 14 controls the spindle motor 40 provided on the enclosure 12 side by a driver 38. Since the recording format of the MO cartridge is the ZCAV, the spindle motor 40 is rotated at a constant speed of, for example, 3600 rpm. The MPU 14 also controls an electromagnet 44 provided on the enclosure 12 side via a driver 42. The electromagnet 44 is arranged on the side opposite to the beam irradiating side of the MO cartridge loaded in the apparatus and supplies an external magnetic field to the medium in the recording and erasing modes. A DSP 15 realizes a servo function for positioning the beam from the laser diode 30 to the medium. For this purpose, a 4-split detector 46 for receiving a beam mode light from the medium is provided for the optical unit on the enclosure 12 side, and an FES detecting circuit (focusing error signal detecting circuit) 48 forms a focusing error signal E1 from photosensing outputs of the 4-split detector 46 and inputs it to the DSP 15. A TES detecting circuit (tracking error signal detecting circuit) 50 forms a tracking error signal E2 from the photosensing outputs of the 4-split detector 46 and inputs it to the DSP 15. The tracking error signal E2 is inputted to a TZC circuit (track zero-cross point detecting circuit) 45 and a track zero-cross pulse E3 is formed and inputted to the DSP 15. Further, a lens position sensor 52 for detecting a position of an objective lens for irradiating the laser beam to the medium is provided on the enclosure 12 side and a lens position detection signal (LPOS) E4 of the lens position sensor 52 is inputted to the DSP 15. The DSP 15 drives a focusing actuator 56, a lens actuator 60, and a VCM 64 via drivers 54, 58, and 62 for the purpose of beam positioning.

FIG. 2 schematically shows the enclosure in the optical disk drive. The spindle motor 40 is provided in a housing 66. By inserting an MO cartridge 70 from the side of an inlet door 68 to a hub of a rotary shaft of the spindle motor 40, a loading such that an MO medium 72 in the MO cartridge 70 is attached to the hub of the rotary shaft of the spindle motor 40 is performed. A carriage 76 which can be moved in the direction traversing the medium tracks by the VCM 64 is provided below the MO medium 72 of the MO cartridge 70 loaded. An objective lens 80 is mounted on the carriage 76 and a beam from a semiconductor laser provided for a fixed optical system 78 enters the objective lens 80 via a prism 82, thereby forming a beam spot onto the surface of the MO medium 72. The objective lens 80 is moved in the optical axial direction by the focusing actuator 56 shown in the enclosure 12 in FIG. 1 and can be also moved in a radial direction traversing the medium tracks within a range of, for example, tens of tracks by the lens actuator 60. The position of the objective lens 80 mounted on the carriage 76 is detected by the lens position sensor 52 in FIG. 1. The lens position sensor 52 sets the lens position detection signal to "0" at a neutral position where the optical axis of the objective lens 80 is directed right overhead and generates the lens position detection signal E4 according to movement amounts having different polarities for the movement to the outer side and the movement to the inner side.

[LD light emission control]

Figure 3:
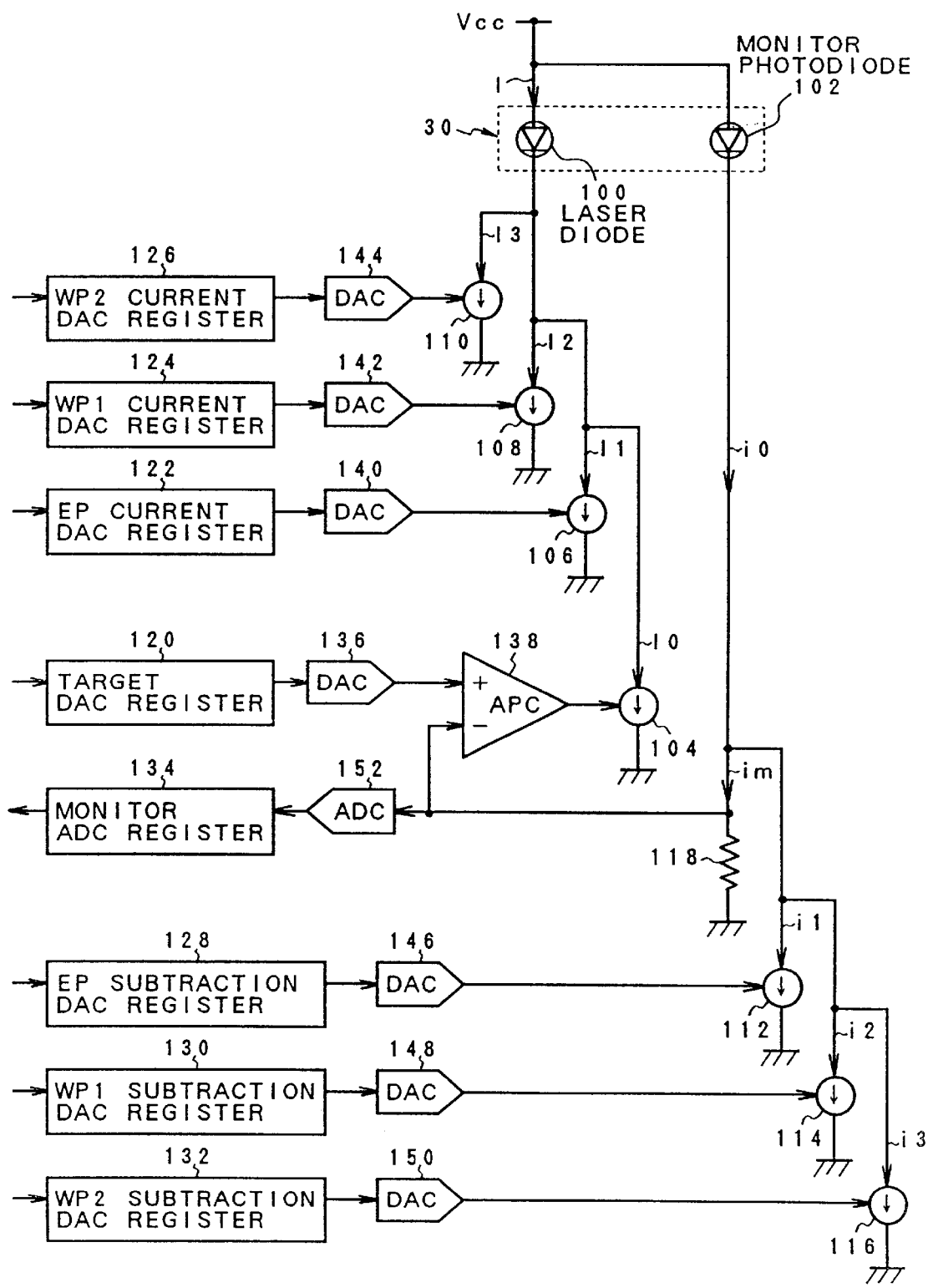
FIG. 3 is a block diagram of a laser diode control circuit in FIGS. 1A and 1B.

FIG. 3 is a circuit block diagram of the laser diode control circuit 24 provided for the control unit 10 in FIGS. 1A and 1B and shows an MO cartridge medium which needs the erasing operation before the writing operation as an example. With respect to a medium of the direct overwrite corresponding type which doesn't need the erasing operation, an erasing power of the MO cartridge is replaced by an assisting power for increasing the rising speed of a writing power in case of the direct overwriting operation. In the laser diode unit 30, a laser diode 100 and a monitor photodiode 102 are integratedly provided. The laser diode 100 receives a driving current I by a power voltage Vcc and emits light. A laser beam is formed and irradiated to the medium surface by the optical unit and the recording and reproducing operations are performed. The monitor photodiode 102 receives a part of the light from the laser diode 100 and outputs a photosensing current i0 which is proportional to the light emitting power of the laser diode 100. A reading power current source 104, an erasing power current source 106, a first writing power current source 108, and a second writing power current source 110 are connected in parallel to the laser diode 100 and supply a reading power current I0, an erasing power current I1, a first writing power current I2, and a second writing power current I3, respectively. That is, the reading power current I0 flows at the time of the reading power light emission, a current (I0+I1) obtained by adding the erasing power current I1 to the reading power current I0 flows at the time of the erasing power light emission, and a current (I0+I1+I2) obtained by further adding the first writing power current I2 to the current (I0+I1) flows at the time of the first writing power light emission. A current (I0+I1+I3) obtained by adding the second writing power current I3 to the reading power current I0 and erasing power current I1 flows at the time of the second writing power light emission. An automatic power control unit (hereinbelow, called an "APC") 138 is provided for the reading power current source 104. A specified target reading power is set as a target power into the APC 138 via a target DAC register 120 and a D/A converter (hereinbelow, called a "DAC") 136. An EP current DAC register 122 and a DAC 140 are provided as an EP current instructing unit for the erasing power current source 106. A WP1 current DAC register 124 and a DAC 142 are provided as a WP1 current instructing unit for the first writing power current source 108. Further, a WP2 current DAC register 126 and a DAC 144 are provided as a WP2 current instructing unit for the second writing power current source 110. Consequently, the currents of the current sources 104, 106, 108, and 110 can be properly changed by setting DAC instruction values to the corresponding registers 120, 122, 124, and 126, respectively. A light emission current source circuit is constructed by the registers, DACs, and constant current sources. The APC 138 executes a feedback control so that a monitor current im obtained from the photosensing current i0 of the photodiode 102 coincides with the target voltage of the DAC 136 corresponding to the target reading power. For this purpose, subtraction current sources 112, 114, and 116 are provided for the monitor photodiode 102 in order to subtract the photosensing currents when the light is emitted by the erasing power and the first and second writing powers which exceed the reading power and to feed back the monitor current im corresponding to the reading power to the APC. An arbitrary subtraction current i1 can be set to the subtraction current source 112 for the erasing power by an EP subtraction DAC register 128 and a DAC 146 serving as an EP subtraction current instructing unit. An arbitrary subtraction current i2 can be set to the subtraction current source 114 for the first writing power by a WP1 subtraction DAC register 130 and a DAC 148 serving as a WP1 subtraction current instructing unit. Further, an arbitrary subtraction current i3 can be also set to the subtraction current source 116 for the second writing power by a WP2 subtraction DAC register 132 and a DAC 150 serving as a WP2 subtraction current instructing unit. The monitor currents im in the light emitting modes of the above three subtraction current sources i1, i2, and i3 are as follows.

I. At the time of the reading power light emission:
im=i0

II. At the time of the erasing power light emission:
im=i0−i1

III. At the time of the first writing power light emission: im=i0−(i1+i2)

IV. At the time of the second writing power light emission: im=i0−(i1+i3)

Consequently, at the time of the light emission by any one of the erasing power, the first writing power, and the second writing power exceeding the target reading power, by subtracting the corresponding subtraction current from the photosensing current i0, the monitor current im is supplied as a current corresponding to the reading power to a resistor 118 for detecting a monitor voltage and is fed back to the APC 138. The APC 138, therefore, controls the reading power current source 104 so as to always maintain the target reading power irrespective of the kind of light emitting power, thereby realizing the automatic power control of the specified erasing power, first writing power, and second writing power. With respect to the subtraction current as well, a subtraction current source circuit is constructed by the registers, DACs, and constant current sources. A monitor voltage by the monitor voltage detecting resistor 118 corresponding to the monitor current im is converted to digital data by an A/D converter (hereinbelow, called an "ADC") 152. After the digital data was inputted to a monitor ADC register 134, it is read out to the MPU 14 side. The ADC 152 and monitor ADC register 134 consequently construct a measuring unit of the monitor current im.

FIG. 3 shows the MO cartridge which requires the erasing operation as an example. In case of a cartridge medium of the direct overwrite corresponding type which does not need the erasing operation, in the PWM recording, a first writing power WP1 and a second writing power WP2 are added to a power (RP+AP) obtained by adding an assisting power AP to a reading power RP. In the PPM recording, the first writing power WP1 is added to the power (RP+AP) obtained by adding the assisting power AP to the reading power RP. Consequently, it is sufficient that the registers 124 and 128, the DACS 142 and 146, and the current sources 110 and 112 for an erasing power EP in FIG. 3 are replaced to those for the assisting power AP. It will be obviously understood that registers, DACs, and current sources which are exclusively used for the assisting power can be also added.

FIGS. 4A to 4J are time charts for signals of the PWM recording, light emission current, and subtraction current in the laser diode control circuit 24 in FIG. 3 and show the cartridge medium of 540 MB or 640 MB of the direct overwrite corresponding type which does not need the erasing operation as an example. Now, assuming that write data of FIG. 4B was supplied synchronously with a write gate of FIG. 4A, the write data is converted to pulse width data of FIG. 4D synchronously with a write clock of FIG. 4C. On the basis of the pulse width data, an assist pulse as shown in FIG. 4E is generated and, further, a first write pulse as shown in FIG. 4F is generated. Further, a second write pulse of FIG. 4G is generated. The second write pulse has the number of pulses according to the pulse width of the pulse width data of FIG. 4D. For example, the head pulse width data has a pulse width of four clocks, the next pulse width data has a pulse width of two clocks, and the following pulse width data has a pulse width of three clocks. In correspondence with it, the second write pulse of FIG. 4G generates two pulses with respect to the four-clock width of the head data after the first write pulse of FIG. 4F, generates zero pulse with respect to the next two-clock width, and generates one pulse with respect to the third pulse width of three clocks, thereby recording information indicative of the pulse width. FIG. 4H shows the light emission currents and powers based on the assist pulse of FIG. 4E, first write pulse of FIG. 4F, and second write pulse of FIG. 4G. A read current is always supplied and a DC light emission is performed by the reading power RP. Consequently, a light emission current (I0+I1) flows synchronously with the assist pulse, so that the current is increased by an amount corresponding to the assist power AP. The light emission current I2 is added at the timing of the first write pulse, so that the current is increased by an amount corresponding to the first writing power WP1. Further, the light emission current I3 is added at the timing of the second write pulse (I0+I1+I3), so that the current is increased by an amount corresponding to the second writing power WP2. Synchronously with the light emission current of FIG. 4H, a subtraction current of FIG. 4I flows in the subtraction current sources 112, 114, and 116 in FIG. 3. That is, the subtraction current i1 corresponding to the increased amount of the assisting power AP flows. The subtraction current i2 corresponding to the increased amount of the next first writing power WP1 is added and a resultant subtraction current (i1+i2) flows. Further, the subtraction current i3 corresponding to the increased amount of the second writing power WP2 is added and a resultant subtraction current (i1+i3) flows. The monitor current im of FIG. 4J is a value obtained by subtracting the subtraction current of FIG. 4H from the photosensing current i0 corresponding to the light emission current and the light emitting power of FIG. 4H and is always converted to a constant current corresponding to the reading power even during light emission and the constant current is fed back to the APC 138.

FIGS. 5A to 5J are timing charts for signals, light emission currents, subtraction current, and monitor current when the PPM recording is performed to the medium of 540 MB or 640 MB of the direct overwrite corresponding type as an example. Now, assuming that write data of FIG. 5B was supplied synchronously with a write gate of FIG. 5A, pulse width data of FIG. 5D is formed synchronously with a write clock of FIG. 5C. In correspondence to the pulse width data, an assist pulse of FIG. 5E and a first write pulse of FIG. 5F are generated. In the PPM recording, a second write pulse of FIG. 5G is not used. By supplying a light emission current of FIG. 5H by the assist pulse and the first write pulse to the laser diode, a light emitting power P can be obtained. In the PPM recording, a power (PR+AP) is obtained by adding the assisting power AP to the reading power RP at the timing of the assist pulse. In this case, the assisting power AP is set to the reading power RP itself (AP=RP), so that the light emission by the reading power RP by the reading power current I0 is maintained even at the timing of the assist pulse. At the timing of the first write pulse, the light emission current is increased only by an amount of (I1+I2) and a power obtained by adding an amount of the assisting power AP to an amount of the first writing power WP1 is used. A subtraction current (i1+i2) of FIG. 5I is supplied at the light emission timing of the first write pulse. The monitor current im of FIG. 5J is, therefore, always maintained to a current equivalent to the photosensing current of the reading power.

[Division test writing process]

Figure 6B:
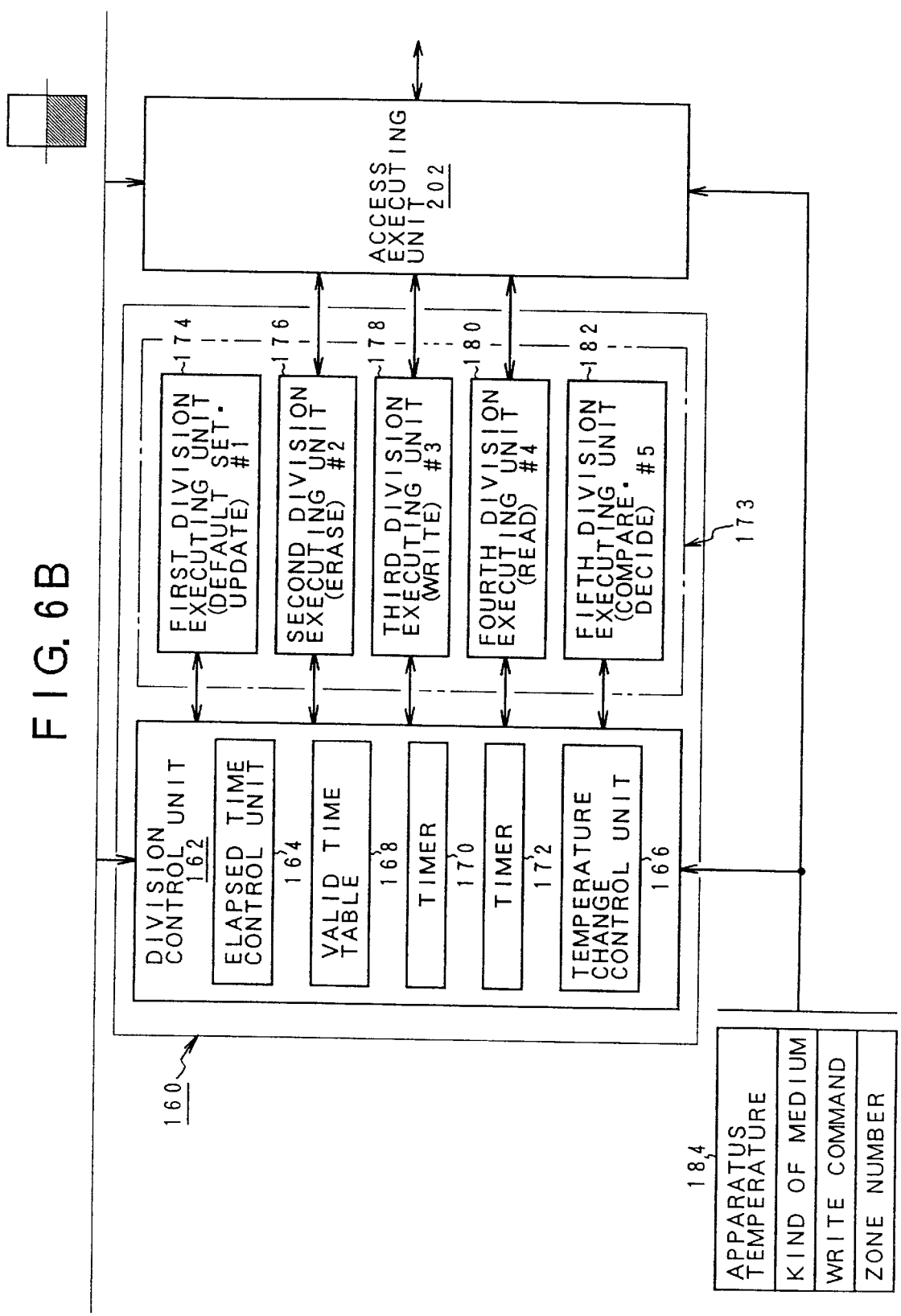

FIGS. 6A and 6B are functional block diagrams of a division test writing process according to the invention which is realized by the MPU 14 in the optical disk drive in FIGS. 1A and 1B. A division test writing processing unit 160 is constructed by a division control unit 162 and a division executing unit 173. The division control unit 162 discriminates about the necessity of the test writing process when a write command is received from the upper apparatus. If the test writing process is necessary, the division executing unit 173 is started and allowed to perform the test writing process. There are following two processes for determining about the necessity of the test writing by the division control unit 162.

I. Determination about the necessity of the test writing based on the elapsed time since the medium has been loaded.

II. Determination about the necessity of the test writing based on a change in temperature in the apparatus detected by the temperature sensor 36 in FIG. 1.

In order to determine the necessity of the two test writing, the division control unit 162 has an elapsed time control unit 164 and a temperature change control unit 166. The determination of the necessity of the test writing by the elapsed time control unit 164 and temperature change control unit 166 is as shown in a time schedule of FIG. 7A.

Figure 7A:
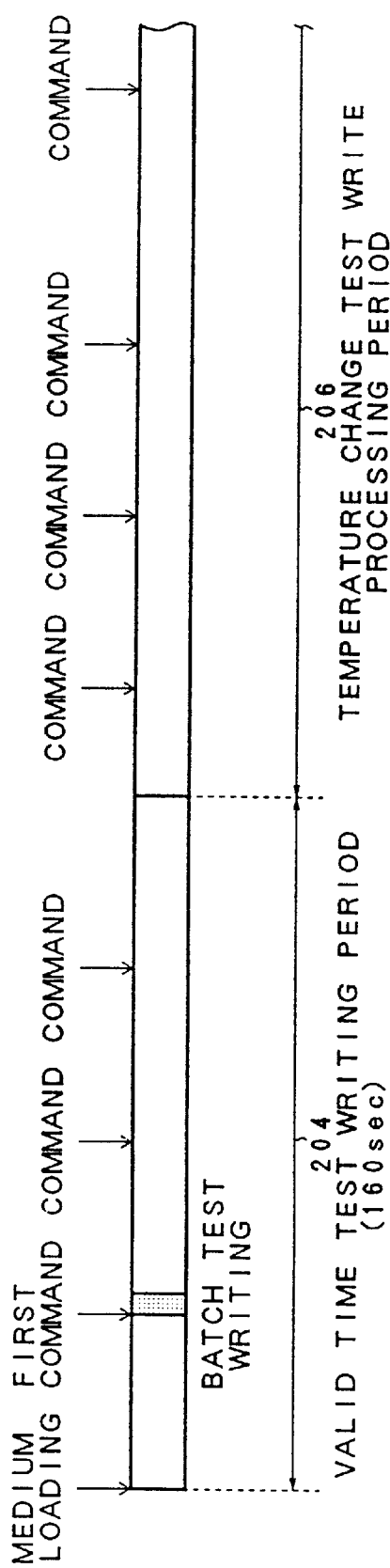
FIGS. 7A and 7B are explanatory diagrams of the test writing process of the invention according to a time schedule after the medium was loaded.

FIG. 7A shows the time schedule when the medium cartridge is loaded into the optical disk drive. A period of time which is required until, for example, a time of 160 seconds elapses from the loading of the medium is set to a valid time test write processing period 204 for determining the necessity of the test writing by the elapsed time control unit 164. With respect to the time after 160 seconds when the valid time test write processing period 204 has passed, the time schedule is switched to a temperature change test write processing period 206 by the temperature change control unit 166. The valid time test write processing period 204 is started from the timing of the loading of the medium into the optical disk drive. The elapsed time from the medium loading is measured by an elapsed time timer 170 provided in the division control unit 162 in FIGS. 6A and 6B. The time measured by the elapsed time timer 170 is expressed by an elapsed time A. When the medium is loaded in FIG. 7A, a first write command is issued from the upper apparatus. In response to the first write command, the elapsed time control unit 164 in the division control unit 162 turns on a batch execution flag for setting a batch process and a dividing process of the test writing, for the division executing unit 173 and a batch test writing process is executed. That is, in the invention, the test writing process is divided into a plurality of execution units which are sequentially executed each time the write command is received from the upper apparatus. With respect to the first write command, however, since the optimum light emitting power is not obtained, the dividing process is not executed and the optimum light emitting power is found by the batch test writing. When the batch test writing is performed by the first command in FIG. 7A and the optimum light emitting power is determined, a valid time Tv in which the optimum light emitting power determined by the batch test writing can be validly used is set in accordance with the elapsed time A measured by the elapsed time timer 170 at that time. The relation of the valid time Tv to the elapsed time A is set by a valid time table 168.

FIG. 8 shows an example of the valid time table 168 in FIGS. 6A and 6B. The valid time Tv is set so as to be longer as the elapsed time increases. For example, when the optimum light emitting power is determined by the test writing within 0 to 19 seconds of the elapsed time A, the valid time Tv is set to 20 seconds. With respect to the elapsed time of 20 to 39 seconds, the valid time Tv is set to 40 seconds. With respect to the elapsed time of 40 to 59 seconds, Tv is set to 60 seconds. With respect to the elapsed time of 60 to 160 seconds, Tv is set to 160 seconds. That is, just after the power of the optical disk drive was turned on and the medium cartridge was loaded, the temperature in the drive rapidly increases and a distribution of the temperatures in the drive is not even. When the elapsed time A is short, therefore, the test writing is frequently performed. When the elapsed time A is long, the valid time Tv is set so as to reduce the frequency of the test writing and the necessity of the test writing is determined.

Figure 7B:
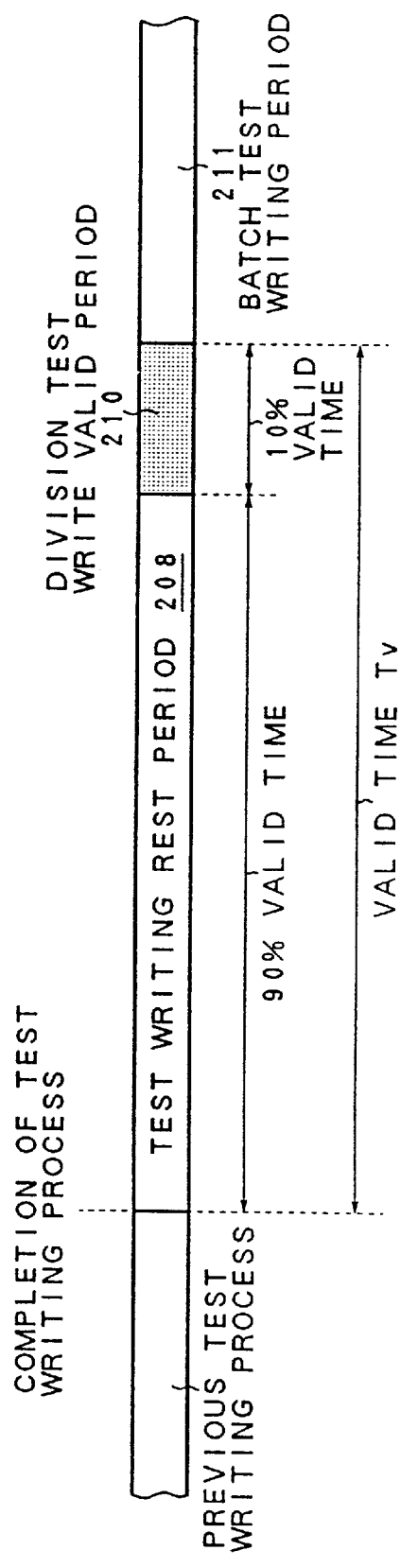

FIG. 7B is a time schedule for the division test writing process when a write command from the upper apparatus is received in the valid time test write processing period 204 after the first optimum light emitting power was determined by the batch test writing based on the first command in FIG. 7A. At the time point of the completion of the previous test writing process, the valid time Tv when the next test writing is necessary is set from the valid time table of FIG. 8 on the basis of the elapsed time A at that time. The elapsed time control unit 164 in FIGS. 6A and 6B sets 90% of the valid time Tv to a test writing rest period 208. Even when the write command is received from the upper apparatus for the test writing rest period 208, the optimum light emitting power by the previous test writing process is validated and the test writing process is not executed. Following to the test writing rest period 208 determined by 90% of the valid time, a division test write valid period 210 having the duration of 10% of the valid time set in a range from 90% to 100% of the valid period Tv is set. When the write command is received from the upper apparatus in the division test write valid period 210, the elapsed time control unit 164 turns off the batch execution flag, thereby executing the test write dividing process by the division executing unit 173. As shown by the division executing unit 173 in FIGS. 6A and 6B, the division test writing process in the division test write valid period 210 is divided into five dividing processes which are sequentially executed by a first division executing unit 174, a second division executing unit 176, a third division executing unit 178, a fourth division executing unit 180, and a fifth division executing unit 182. The first division executing unit 174 sets a default value of the light emitting power as an initial value for obtaining the optimum light emitting power. When the light emitting power is not obtained by a default value, the default value is updated. The default value is read out from a default erasing/assisting power table 188 and a default writing power table 190 provided for a light emitting power adjusting unit 186 and is set. In place of the default erasing/assisting power table 188, a default erasing power table and a default assisting power table which are exclusively used can be also individually provided. In the first division executing unit 174, the correction of the default value by the temperature in the apparatus stored in a register group 184 when the default value is set is executed by reading out a temperature correction coefficient from a temperature correction coefficient table 192 provided for the light emitting power adjusting unit 186. As for the setting of the default value for determining the light emitting power for the test writing by the first division executing unit 174, the test writing is executed while changing the default value every predetermined default unit. Specifically, the test writing is executed while changing the light emitting power at five stages of (default−2), (default−1), (default), (default+1), and (default+2). The second division executing unit 176 erases a test region of the medium by the light emission of the laser diode by the erasing power set by the first division executing unit 174. In case of the direct overwrite corresponding type medium, the process of the second division executing unit 176 is skipped. The third division executing unit 178 drives the laser diode to emit light by the writing power set by the first division executing unit 174, thereby writing a predetermined test pattern into the erased test region. The fourth division executing unit 180 executes a process for reading out the test pattern written by the third division executing unit 178. Further, the fifth division executing unit 182 compares a write pattern by the third division executing unit 178 with a read pattern by the fourth division executing unit 180 on a bit unit basis and obtains the number of times of dissidence for the light emitting power at that time. In the division test writing processes by the first to fifth division executing units 174 to 182, the processes at the five stages (−2, −1, 0, +1, +2) are repeated for the default value of the light emitting power by the first division executing unit 174 and the fifth division executing unit 182 determines the optimum light emitting power from the processing result. That is, in order to find the optimum light emitting power by one test writing process, it is necessary to repeat the division test writing of the default setting, erasing, writing, reading and comparing five times. Further, when the optimum light emitting power is not found even after the division test writing was repeated five times, the default value itself which is initially set by the first division executing unit 174 is updated to another value, the same processes are repeated, and the test writing is repeated until the optimum light emitting power is obtained.

Figure 9:
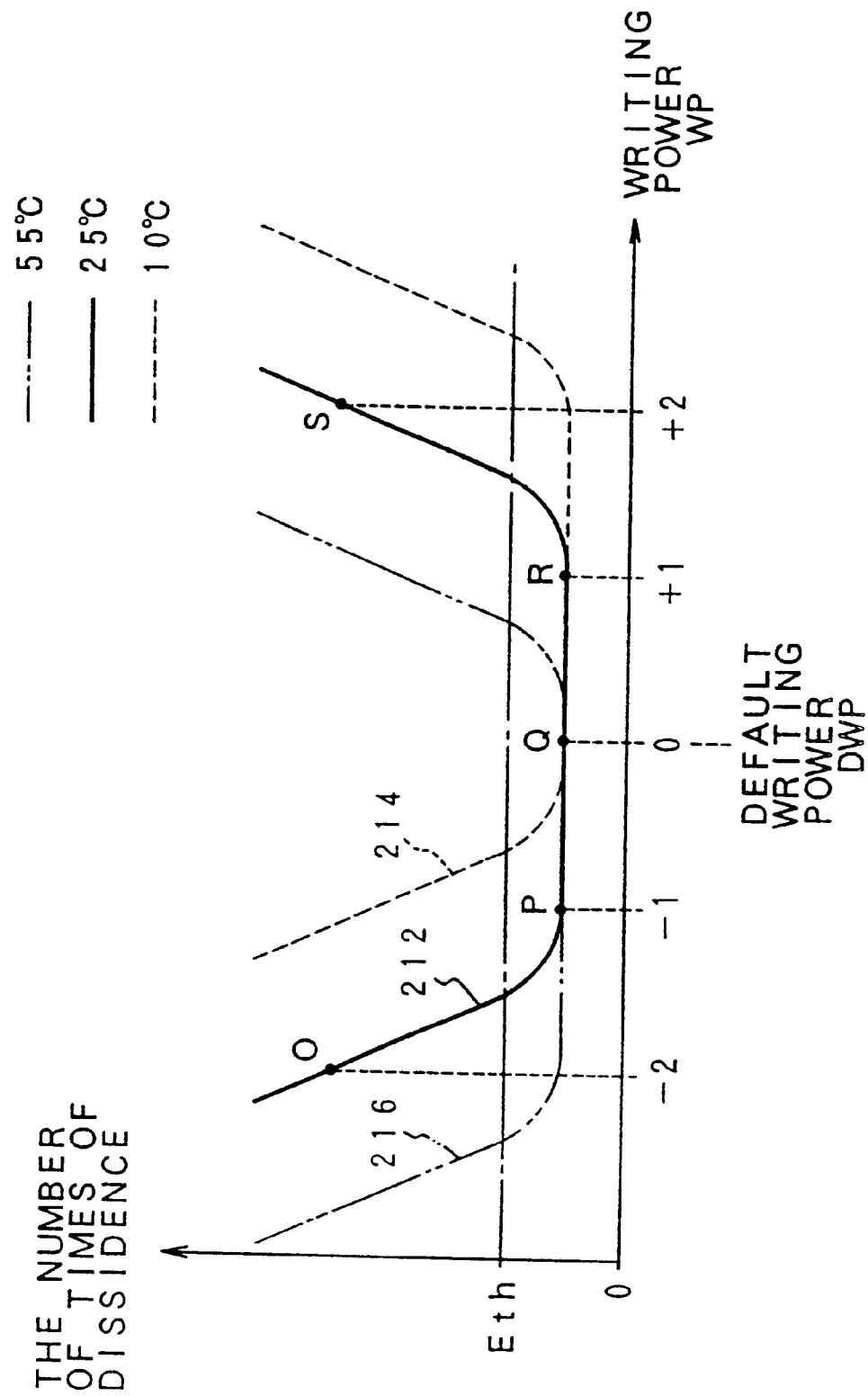
FIG. 9 is a characteristics diagram of light emitting powers and the number of errors obtained by a division test writing process in order to calculate an optimum light emitting power of the invention.

FIG. 9 shows a measurement result which is obtained by the test writing process to decide the optimum light emitting power by the division executing unit 173 in FIG. 6 and relates to the optimum light emission adjustment of the writing power as an example. Before the test writing, the first division executing unit 174 obtains a default power DWP corrected by the apparatus temperature at that time and first sets a writing power $$WP=DWP-2$$

which is lower than the default power DWP by 2 units. The erasing operation by the second division executing unit 176, the writing operation of the test pattern by the third division executing unit 178, and the reading operation by the fourth division executing unit 180 are executed. Further, the number of times of dissidence between the writing pattern and the reading pattern is measured by the fifth division executing unit 182. The number (E) of times of dissidence in this case is equal to an 0 point and exceeds a threshold value Eth showing the limit of the optimum light emitting power. Subsequently, a writing power $$WP=DWP-1$$

in which the default power DWP is increased by −1 unit is updated and set into the first division executing unit 174. The erasing operation by the second division executing unit 176, the writing operation of the test pattern by the third division executing unit 178, and the reading operation by the fourth division executing unit 180 are executed. The number of times of dissidence of the bits between the write pattern and the read pattern is measured by the fifth division executing unit 182. In this case, the number of times of dissidence is smaller than the threshold value Eth indicating the limit of the optimum light emitting power like a P point and the writing power (DWP−1) can be labeled as an optimum power. Similarly, the writing power WP is changed to 0, +1, and +2 for the default power DWP and the number of times of dissidence at this time is obtained as shown at Q point, R point, and S point. In this case, the number of times of dissidence at each of the Q point and R point is smaller than the threshold value Eth and lies within the range of the optimum light emitting power. At the point S, the number of times of dissidence is larger than the threshold value Eth and is out of the range of the optimum light emitting power. When the numbers of times of dissidence in the test writing by the adjustment of the writing power WP at five stages of (−2, −1, 0, +1, +2) for the default power DWP are obtained, the median of the three points of P, Q, and R which are smaller than the threshold value Eth, namely, the writing power WP=DWP at the point Q is determined as an optimum light emitting power. The characteristics of the number of times of dissidence by the test writing for the writing power WP are shifted to the right and left in dependence on the temperature in the apparatus. That is, now assuming that the apparatus temperature is equal to 25° C., characteristics 212 which are shown by a solid line and are given at five measurement points of O, P, Q, R, and S by the test writing are shifted in such a direction as to increase the optimum writing power as shown by characteristics 214 of a broken line when the apparatus temperature decreases to 10° C. On the contrary, when the apparatus temperature increases to 55° C., the characteristics 212 are shifted in such a direction as to reduce the optimum light emitting power as shown by characteristics 216 of an alternate long and two short dashes line. As clearly shown from the characteristics 212, 214, 216 of the number of errors for the optimum light emitting power which differs depending on the apparatus temperature, it will be understood that the optimum light emitting power at the time of the test writing largely fluctuates due to the apparatus temperature at that time. Therefore, when the test writing is executed in a state where the optimum writing power corresponding to the apparatus temperature at that time is far from the default writing power, for example, in a state like the characteristics 216 when the apparatus temperature rises to 55° C., there is a case where the optimum writing power cannot be found in the test writing at five stages by (−2, −1, 0, +1, +2) of the writing power for the default power DWP. Therefore, it is necessary to correct the default power DWP to DWP=DWP−1, change the writing power WP to (−2, −1, 0, +1, +2) for the default power after the correction, and execute the test writing. Therefore, it will be understood that if the apparatus temperature largely changes and the optimum power is largely deviated from the default, it takes a fairly long time to search the optimum writing power. Thus, a fairly long time is required until the optimum light emitting power is found and the apparatus determines that the timeout occurred for the access from the upper apparatus, resulting in an error. According to the invention, however, as shown in the division executing unit 173 in FIGS. 6A and 6B, the test writing of one time until the erasing, writing, reading, and comparison deciding operations after the light emitting power was set is divided into five processes and is executed. Until the optimum default power is found after completion of the dividing process, the apparatus responds to an upper command by the access by the previous optimum light emitting power. Therefore, even if it takes a long time for the test writing to find the optimum light emitting power, a situation such that the apparatus determines the occurrence of the time-out for the upper command and the error occurs can be certainly prevented.

In the temperature change control unit 166 provided for the division control unit 162 in FIGS. 6A and 6B, as shown in the time schedule from the medium loading in FIG. 7A, the necessity of the test writing is discriminated with respect to the temperature change test write processing period 206 set as a period of time after the elapse of the valid time test write processing period 204 for 160 seconds. That is, the temperature change control unit 166 detects the apparatus temperature every maximum time, namely, Tv=160 seconds of the valid time Tv set by, for example, the final time of 160 seconds in the valid time test write processing period 204 in the temperature change test write processing period 206 and calculates a temperature difference between the detected temperature and the previous detection temperature. When the temperature difference is equal to or higher than, for example, 3° C., it is determined that the test writing is necessary. Each time the write command is received from the upper apparatus, as shown in FIG. 7A, the dividing processes of the first to fifth division executing units 174 to 182 provided for the division executing unit 173 are sequentially repeated. On the other hand, the division test writing process has an advantage such that it is possible to prevent the situation such that when it takes a time to decide the optimum light emitting power, the time-over occurs for the upper command and an error occurs. However, if the interruption period of time of the dividing process is contrarily so long, the apparatus temperature largely changes for such a long interruption period of time and there is a case where the results up to the previous dividing process cannot validly be used. In the elapsed time control unit 164, therefore, as shown in FIG. 7B, with respect to the period of time after the elapse of the division test write valid period 210 having a width of the valid time of 10% of the range from 90% to 100% of the valid time Tv, namely, after the elapse of the valid time Tv, a batch test writing period 211 is set. When the process is interrupted during the dividing process without finishing all of the division test writing processes until the valid time Tv, if the write command is received from the upper apparatus at the time point of the elapse of the valid time Tv, the processing mode is switched to the batch test writing mode for performing the remaining dividing processes in a lump. Thus, inconvenience such that the division test writing is executed over the valid time Tv and the time required for the test writing which was divisionally executed is too long and the optimum light emitting power is deviated during such a long time is prevented.

In the temperature change control unit 166 in FIGS. 6A and 6B, if the temperature difference by the detection of the apparatus temperature of every maximum valid time Tv=160 seconds is equal to or larger than, for example, 4° C. exceeding 3° C. which is used to discriminate about the necessity of the division test writing process, it takes a time and the adjustment of the optimum light emitting power is delayed in case of performing the division test writing process. In this case, therefore, the processing mode is switched to the batch test writing process to execute the remaining division test writing processes in a lump. Each time the dividing process is executed, the temperature difference between the present temperature and the detection temperature in the previous dividing process is checked. For instance, when there is a temperature change of 2° C. or more, since the results of the dividing processes so far cannot validly be used, in this case, all of the dividing processes so far are cancelled and the dividing processes are again executed from the beginning.

In addition to the apparatus temperature, the medium kind, write/erase information indicative of the kind of upper command, and the zone number of the medium in which the access track is included have been set in the register group 184 to execute the dividing process in the division test write processing unit 160 in FIGS. 6A and 6B. As a kind of medium which is set into the register group 184, there are media of 128 MB, 230 MB, 540 MB, and 640 MB. Further, information indicating whether the medium is an overwrite medium in which data can be written without needing the erasing operation or an ordinary medium in which the erasing and writing operations are individually executed is also stored. When the medium is the overwrite medium, since the erasing operation is unnecessary, the process by the second division executing unit 176 provided for the division executing unit 173 is not performed. As for the zone number of the register group 184, the medium zone in case of the media of 540 MB and 640 MB is divided into three areas and the optimum light emitting power by the test writing is found in the test writing process in the division test write processing unit 160. Therefore, the medium area where the test writing is executed is discriminated by the zone number. The test writing operations in the division test write processing unit 160 are executed in parallel every area. The medium area for the test writing in the media of 540 MB and 640 MB is divided into three areas of an inner rim area, an intermediate area, and an outer rim area. For example, in case of the 640-MB medium, there are 11 zones and they are classified in a manner such that the zone numbers 1 to 4 correspond to the inner rim area, the zone numbers 5 to 8 correspond to the intermediate area, and the zone numbers 9 to 11 correspond to the outer rim area. An inherent optimum light emitting power is found for each area by the test writing. Since there are 18 zones in case of the 540MB medium, they are divided into three areas of an inner rim area, an intermediate area, and an outer rim area on a 6-zone unit basis. An optimum light emitting power is found every area by the test writing.

Figure 10:
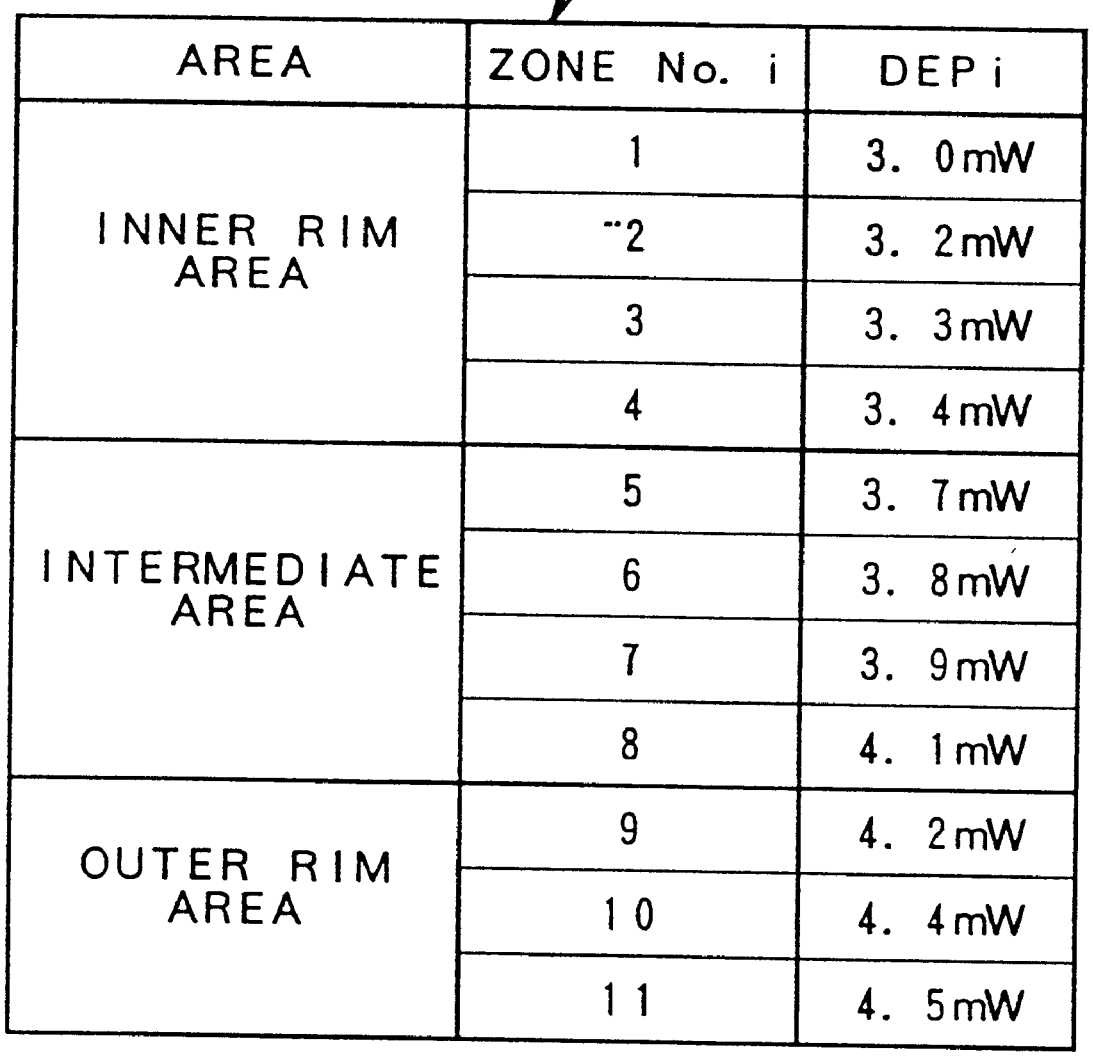
FIG. 10 is an explanatory diagram of a default erasing power table in FIG. 6.
Figure 11:
FIG. 11 is an explanatory diagram of a default writing power table in FIG. 6.
Figure 12:
FIG. 12 is an explanatory diagram of a temperature correction coefficient table in FIG. 6.

The light emitting power adjusting unit 186 in FIGS. 6A and 6B will now be described. The light emitting power adjusting unit 186 executes a light emitting power adjusting process upon activation in association with the power-on of the optical disk drive and stores a processing result into the default erasing assisting power table 188 and default writing power table 190 as default values. Further, the temperature correction coefficient table 192 in which temperature correction coefficients corresponding to the apparatus temperature have been stored is provided. For example, in case of the 640-MB medium, default erasing powers DEPi have been stored as, for example, 3.0 mW to 4.5 mW in the default erasing/assisting power table 188 in correspondence to the zone numbers 1 to 11 as shown in FIG. 10. As shown in FIG. 11, for example, in case of the 640-MB medium, default writing powers DWP=6.0 mW to 11.0 mW have been stored in the default writing power table 190 in correspondence to the zone numbers i=1 to 11. Further, as shown in FIG. 12, temperature correction coefficients Kt=−0.10 to 0.10 have been stored in the temperature correction coefficient table 192 in correspondence to the zone numbers i=1 to 11 of the 540-MB medium. The coefficients Kt in the temperature correction coefficient table 192 in FIG. 12 show the values in case of the apparatus temperature T=25° C. Referring again to FIGS. 6A and 6B, an erasing/assisting power table 194, a first writing power table 196, and a second writing power table 198 to store the optimum light emitting power found out by the test writing of the division test write processing unit 160 are further provided for the light emitting power adjusting unit 186. The erasing power EP which is used for the ordinary MO cartridge and the assisting power AP which is used for the direct overwrite medium have been stored in the erasing/assisting power table 194 and are selectively used in accordance with the discrimination result of the medium kind. In place of the erasing/assisting power table 194, the exclusive-use erasing power table and assisting power table can be also individually provided. Two kinds of writing powers which are used for the PWM recording shown in the time charts of FIGS. 4A to 4J have been stored in the first writing power table 196 and second writing power table 198. Default values in the first writing power table 196 have been stored in the default writing power table 190 and a power ratio of the second writing power to the first writing power has been predetermined. Therefore, by multiplying the default writing power in the default writing power table 190 by a predetermined power ratio, the second writing power WP2 is obtained and the second writing power table 198 can be obtained. As initial values of the erasing/assisting power table 194, first writing power table 196, and second writing power table 198, the temperature correction coefficients Kt are obtained with reference to the temperature correction coefficient table 192 based on the apparatus temperature in a register 200 at that time, and the values obtained by temperature correcting the default values in the default erasing/assisting power table 188 and default writing power table 190 by the temperature correction coefficients Kt are stored. An equation for the temperature correction is given by $$WP=DWP(1+Kt)$$

where,

WP: writing power after completion of the temperature correction

DWP: default writing power

Kt: temperature correction coefficients corresponding to the zone No. i

Figure 13:
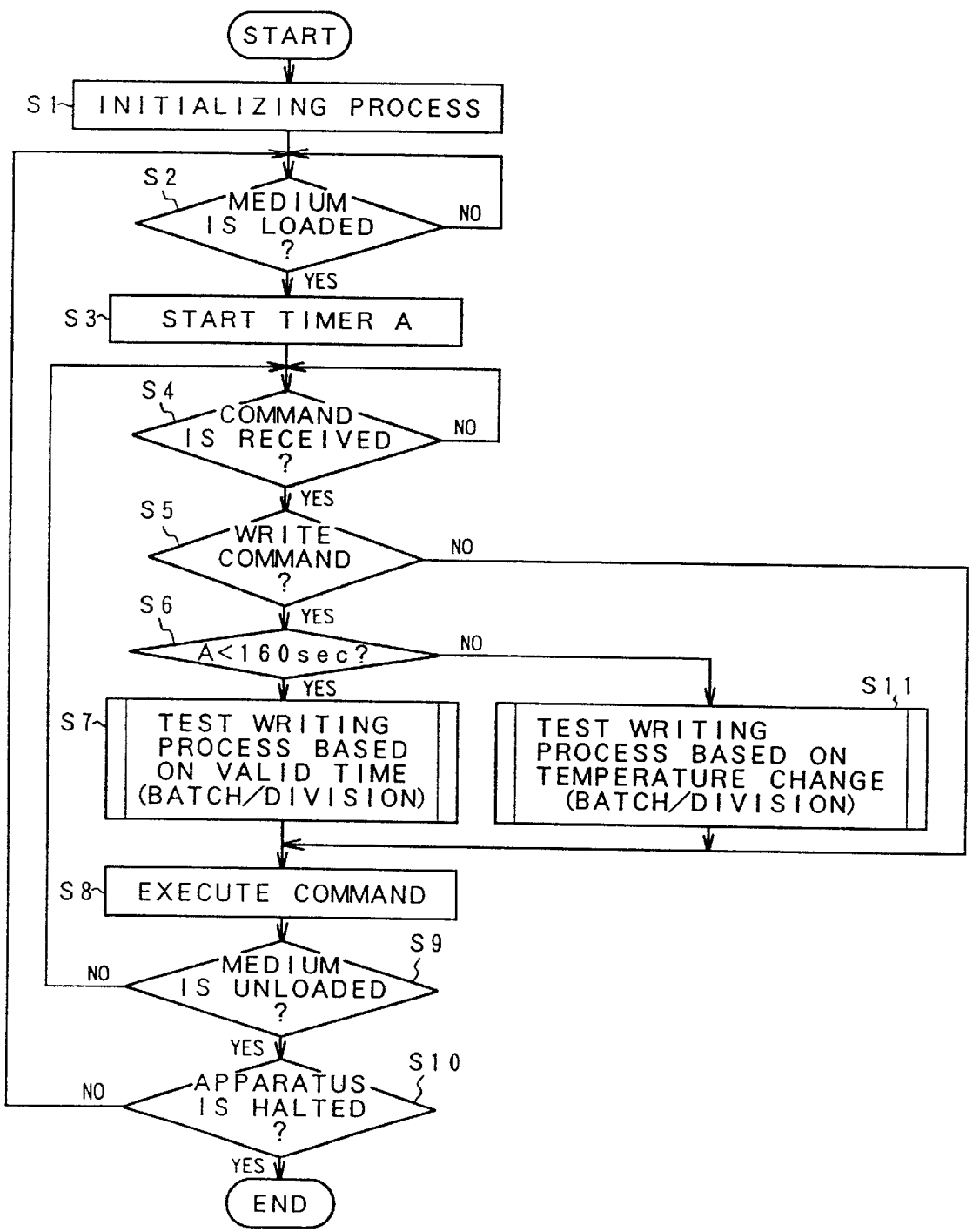
FIG. 13 is a schematic flowchart for the whole operation of the apparatus including a division test writing of the invention.

The processing operation by the division test write processing unit 160 in FIGS. 6A and 6B will now be described. FIG. 13 is a schematic diagram of the whole processes in the optical disk drive having the division test write processing unit 160 in FIGS. 6A and 6B according to the invention.

When the power supply of the optical disk drive is turned on, an initializing process is executed in step S1. A setting adjustment of each default value, temperature correction coefficients, and the like by the light emitting power adjusting unit 186 in FIGS. 6A and 6B is included in the initializing process. When the medium loading is discriminated in step S2, step S3 follows and the measurement of the elapsed time (A) by the elapsed time timer 170 is started. In step S4, whether the command has been received or not is discriminated. When the command is received from the upper apparatus, a check is made in step S5 to see if the received command is the write command. If YES, step S6 follows and a check is made to see if the elapsed time (A) measured by the elapsed time timer 170 is shorter than 160 seconds. When it is shorter than 160 seconds, step S7 follows and the test writing process based on the valid time by the elapsed time control unit 164 is executed. When the test writing process is finished, the write command from the upper apparatus is executed in step S8. In step S9, when the medium is not unloaded, the processing routine is returned to step S4 and the apparatus waits for the reception of a next command from the upper apparatus. In step S6, when the elapsed time (A) is equal to or longer than 160 seconds, step S11 follows and the test writing process based on the temperature change by the temperature change control unit 166 in FIGS. 6A and 6B is executed. After completion of the test writing process, the write command from the upper apparatus is executed in step S8. When the read command is discriminated in step S5, the read command is executed in step S8. When the medium unloading is discriminated in step S9, step S10 follows. When the apparatus is not stopped, the processing routine is returned to step S2 and the apparatus waits for the loading of a next medium. When the apparatus is stopped, a series of processes are finished.

Figure 14:
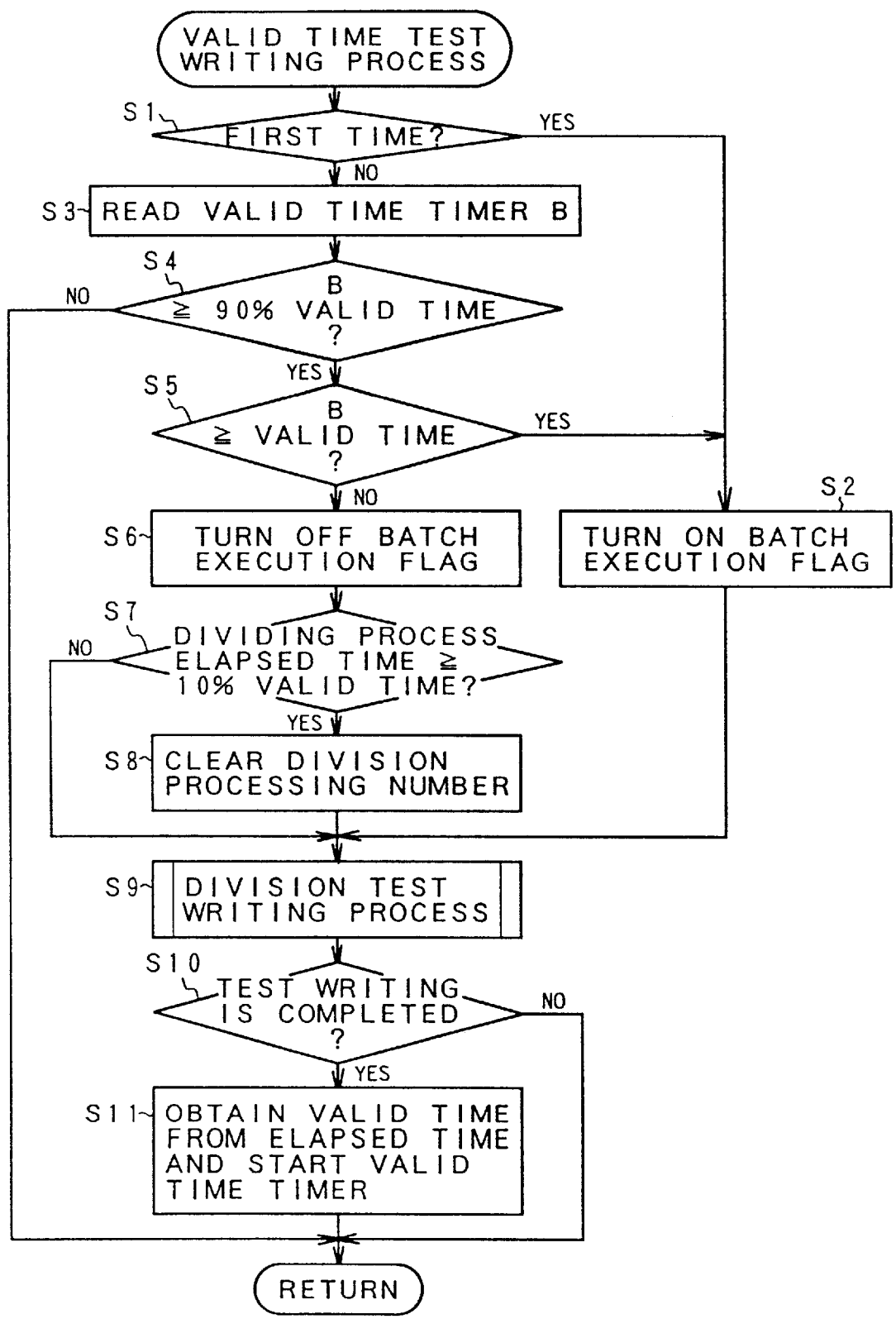
FIG. 14 is a flowchart for a valid time test writing process for discriminating the necessity of a test writing on the basis of a valid time in FIG. 13.

FIG. 14 is a flowchart for the valid time test writing process which is executed in the valid time test write processing period 204 in FIG. 7A when the elapsed time (A) from the medium loading is shorter than 160 seconds in step S7 in FIG. 13. In the valid time test writing process, a check is made to see if the write command from the upper apparatus is the first command in step S1. In case of the first write command, step S2 follows. In this case, since the optimum light emitting power is not found, the batch execution flag is turned on and the dividing processes of the division test writing process are not executed in step S9. The processes by the five first to fifth division executing units 174 to 182 provided for the division executing unit 173 in FIGS. 6A and 6B are executed in a lump, thereby finding the optimum light emitting power. When the batch test writing by the turn-on of the batch execution flag is finished, the valid time Tv is obtained from the elapsed time (A) at that time in step S11 and a valid time timer 172 is started. A measurement time of the valid time timer 172 is labeled as (B). When the command is the second or subsequent write command from the upper apparatus in step S1, the measurement time (B) of the valid time timer 172 is read in step S3. In step S4, a check is made to see whether the value (B) of the valid time timer 172 is equal to or longer than the 90% valid time of the valid time Tv at that time or not. When the value (B) is smaller than the 90% valid time, the processes in steps S5 to S11 are skipped and the division test writing is not performed. When the value (B) of the valid time timer is equal to or larger than the 90% valid time in step S4, step S5 follows. A check is made to see whether the valid time timer value (B) is equal to or larger than the valid time Tv at that time or not. When the value (B) is smaller than the valid time Tv, the batch execution flag is turned off in step S6. The division test writing process is executed in step S9. In this case, a check is made in step S7 to see whether the elapsed time from the previous execution of the dividing process is equal to or larger than the 10% valid time of the valid time Tv at that time or not. If the elapsed time of the dividing process exceeds the 10% valid time, the results of the dividing processes so far cannot be validly used. Therefore, the division processing number is cleared in step S8, thereby again executing the division test writing process in step S9 from the beginning. In the division test writing process in step S9, with reference to the division processing numbers #1, #2, #3, #4, and #5 which have previously been respectively allocated to the first to fifth division executing units 174 to 182 of the division executing unit 173 in FIGS. 6A and 6B, the process of the division executing unit corresponding to the head division processing number which is not yet processed at that time is executed. When any one of the division test writing processes is finished in step S9, a check is made in step S10 to see if the division test writing process has been completed. If NO, the processing routine is again returned to the main routine in FIG. 13 and the apparatus waits for the division test writing by the next upper command. When the division test writing process is completed, the valid time Tv is obtained from the elapsed time (A) measured by the elapsed time timer 170 with reference to the valid time table 168 in FIG. 8. The valid time timer 172 for monitoring the next valid time is cleared and started.

The division test writing process in step S9 in FIG. 14 is as shown in flowcharts of FIGS. 15A, 15B, 16A, and 16B. The division test writing process in FIGS. 15A to 16B is divided into five processing portions shown by the first to fifth division executing units 174 to 182 like a division executing unit 173 in FIGS. 6A and 6B and the processing numbers #1 to #5 are set, respectively. That is, steps S1 to S10 relate to a process of the processing No. #1 by the first division executing unit 174. Steps S11 to S16 relate to the process of the processing No. #2 by the second division executing unit 176. Steps S17 to S21 relate to the process of the processing No. #3 by the third division executing unit 178. Steps S22 to S26 relate to the dividing process of the processing No. #4 by the fourth division executing unit 180. Steps S27 to S34 relate to the dividing process of the processing No. #5 by the fifth division executing unit 182.

First, a default setting updating process by the first division executing unit 174 in steps S1 to S10 corresponding to the processing No. #1 will be explained. First in step S1, a check is made to see if a laser diode readjustment flag is ON. The laser diode readjustment flag is turned on by an error recovering process, for example, when a read error or a write error occurs by the execution of the upper command. In step S2, the readjustment of the laser diode by the light emitting power adjusting unit 186 in FIGS. 6A and 6B is executed. Generally, since the laser diode readjustment flag is OFF, the readjustment of the laser diode in step S2 is skipped. In step S3, subsequently, a medium area of the access track designated by the write command from the upper apparatus is discriminated. In case of the medium of 540 MB or 640 MB which needs the test writing, the medium zone is divided into three areas of the inner rim area, intermediate area, and outer rim area. Therefore, the medium area for test writing which belongs to the access track is discriminated from the zone number. In step S4, a seeking operation to position the light beam to the test area of the medium area discriminated is executed. In case of dividing the medium into three areas of the inner rim area, intermediate area, and outer rim area, for example, in case of the 640-MB medium, as shown in the default erasing power table in FIG. 10, the inner rim area corresponds to the zone Nos. 1 to 4, the intermediate area corresponds to the zone Nos. 5 to 8, and the outer rim area corresponds to the zone Nos. 9 to 11. In the zone Nos. 1 to 11, for example, five tracks at the zone boundary of each zone are preliminarily allocated as one user area. The non-user area at the zone boundary can be used as a test area for the test writing. In this case, each area is divided into a plurality of zones and is distributed to 5 track portions at each zone boundary of the non-user area. Therefore, it is desirable to execute the test writing while using the non-user area of the zone locating at the center of each area as a test area. In step S5, the present time is preserved and a check is made to see if the next dividing process has been executed. In the initial state, since all of the processes of the division processing numbers #1 to #5 are not yet executed, the light emitting power for test writing is initially set on the basis of the apparatus temperature at that time in accordance with the head division processing No. #1 which is not yet executed. The initial setting of the light emitting power is executed by the light emitting power adjusting unit 186 in FIGS. 6A and 6B. The default values and the temperature coefficients are read out from the default erasing/assisting power table 188, default writing power table 190, and temperature correction coefficient table 192. The default erasing power DEP, default first writing power DWP1, and default second writing power DWP2 which were respectively corrected by the temperature coefficients are obtained. A power in which the initial value "−2" among the values in which the light emitting power is set to five stages of (−2, −1, 0, +1, +2) from each default value is subtracted from the default power is initially set. In case of the overwrite medium, an assisting power AP obtained by subtracting the initial value "−2" from the default assisting power DAP is initially set. Subsequently, in step S8, the division processing No. #1 showing the end of the setting process by the first division executing unit 174 is preserved. In step S9, a check is made to see if the batch execution flag is ON. In this case, since the batch execution flag is OFF, step S10 follows and a check is made to see if the processing time exceeded a predetermined division executing time of 0.5 second. When exceeding 0.5 second at this time, the processes after step S11 are not executed but the processing routine is returned to the main routine in FIG. 13. On the other hand, when it doesn't exceed 0.5 second in step S10, step S11 follows and a check is made to see if the next dividing process has been executed.

Since the process of the division processing No. #2 of the second division executing unit 176 as a next dividing process is not yet executed, step S12 follows and a check is made to see if the medium is the overwrite medium. In case of the overwrite medium, since the erasing operation of the test sector in step S13 is unnecessary, this process is skipped. In case of the ordinary MO medium, the test sector is erased in step S13 by the light emission of the erasing power EP=DEP1−2 at that time. When the erasing operation of the test sector in step S13 is finished, the division processing No. #2 is preserved in the RAM or the like in step S14. In step S15, a check is made to see if the batch execution flag is ON. In step S16, a check is made to see if the processing time has exceeded 0.5 second. If YES, the processes after step S17 are not executed and the processing routine is returned to the main routine in FIG. 13. When the time is equal to or shorter than 0.5 second in step S16, step S17 in FIG. 16 follows. A check is made to see if the next dividing process has been executed, namely, whether the process of the division processing No. #3 of the third division executing unit 178 has been executed. When the process of the division processing No. #3 is not executed yet, the writing process of the test pattern for the test writing sector is executed in step S18. In the writing process of the test writing sector in this case, the ECC and CRC are not formed and only the writing operation of predetermined write patterns is executed. As test patterns which are used for the writing process, test patterns prepared in the RAM at the time of the batch test writing process by the first write command are used. As write patterns which are prepared in the RAM, "596595" as a worst pattern in which it is predicted that an error generation probability is the largest and "FEDC . . . 3210" as all patterns of each word of hexadecimal notation are used. After completion of the writing process for the test writing sector in step S18, the division processing No. #3 of the writing process is preserved in the RAM in step S19. After that, a check is made in step S20 to see if the batch execution flag is ON. A check is made in step S21 to see if the processing time has exceeded 0.5 second. If YES, the processing routine is returned to the main routine in FIG. 13. When it is equal to or shorter than 0.5 second, a check is made in step S22 to see if the next process of the division processing No. #3 by the third division executing unit 178 has been executed. If it is not yet executed, step S23 follows and the test writing sector which was written in step S18 is read. As a reading process in this case, the reading process without an error correction of the ECC and CRC is performed. When the reading process is finished, the division processing No. #4 is preserved in the RAM in step S24. After that, whether the batch execution flag is ON or not is discriminated in step S25. A check is made in step S26 to see if the processing time has exceeded 0.5 second. If YES, the processing routine is returned to the main routine in FIG. 13. When the processing time doesn't exceed 0.5 second, a check is made in step S27 to see if the process of the division processing No. #5 of the fifth division executing unit 182 serving as a next dividing process has been executed. When it is not yet executed, the number of errors is calculated in step S28 from the processing results derived by the dividing processes of the division processing Nos. #1 to #4 so far. That is, the write patterns written in the test writing sector of the medium in step S18 and the read pattern read out from the test writing sector in step S23 are compared on a bit unit basis, thereby calculating the number of times of dissidence. In step S25, the division processing No. #5 is preserved in the RAM. After that, a check is made in step S30 to see if the adjustment value of the light emitting power of the test writing has exceeded "default+2" serving as a maximum adjustment value, namely, the erasing, writing, and reading processes by the setting of the light emitting power of five times have been finished. When they are not yet finished, the light emitting power is increased by one unit in step S31. After that, the processing routine is again returned to step S10 in FIG. 15B. When the processes of five times in which the light emitting power is changed are finished, the process to calculate the optimum power is executed in step S32. When the optimum power can be calculated, all of the division processing Nos. #1 to #5 of the processes which were executed are cleared. Since the new optimum power can be set in step S34, the valid time Tv is further obtained from the measurement time (A) of the elapsed time timer 170 at that time with reference to the valid time table 168 in FIG. 8, the valid time timer 172 is cleared, and the counting operation of the valid time (B) is restarted. When the elapsed time (A) of the elapsed time timer 170 is equal to or longer than A=160 seconds, the valid time Tv is fixed to the maximum value of Tv=160 seconds.

Figure 16A:
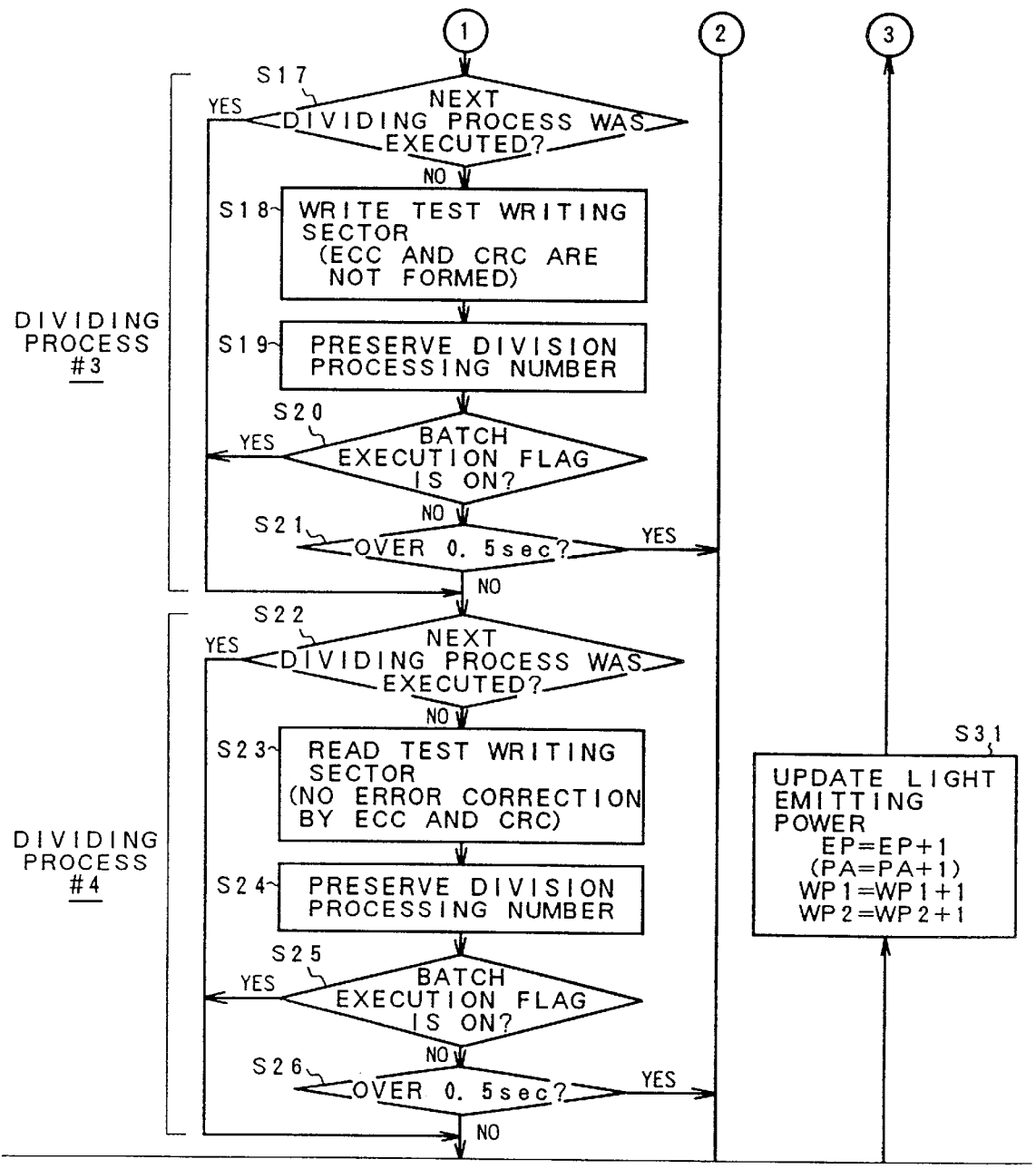
FIGS. 16A and 16B are detailed flowcharts for the division test writing process in FIG. 14 subsequent to FIG. 15B.
Figure 16B:
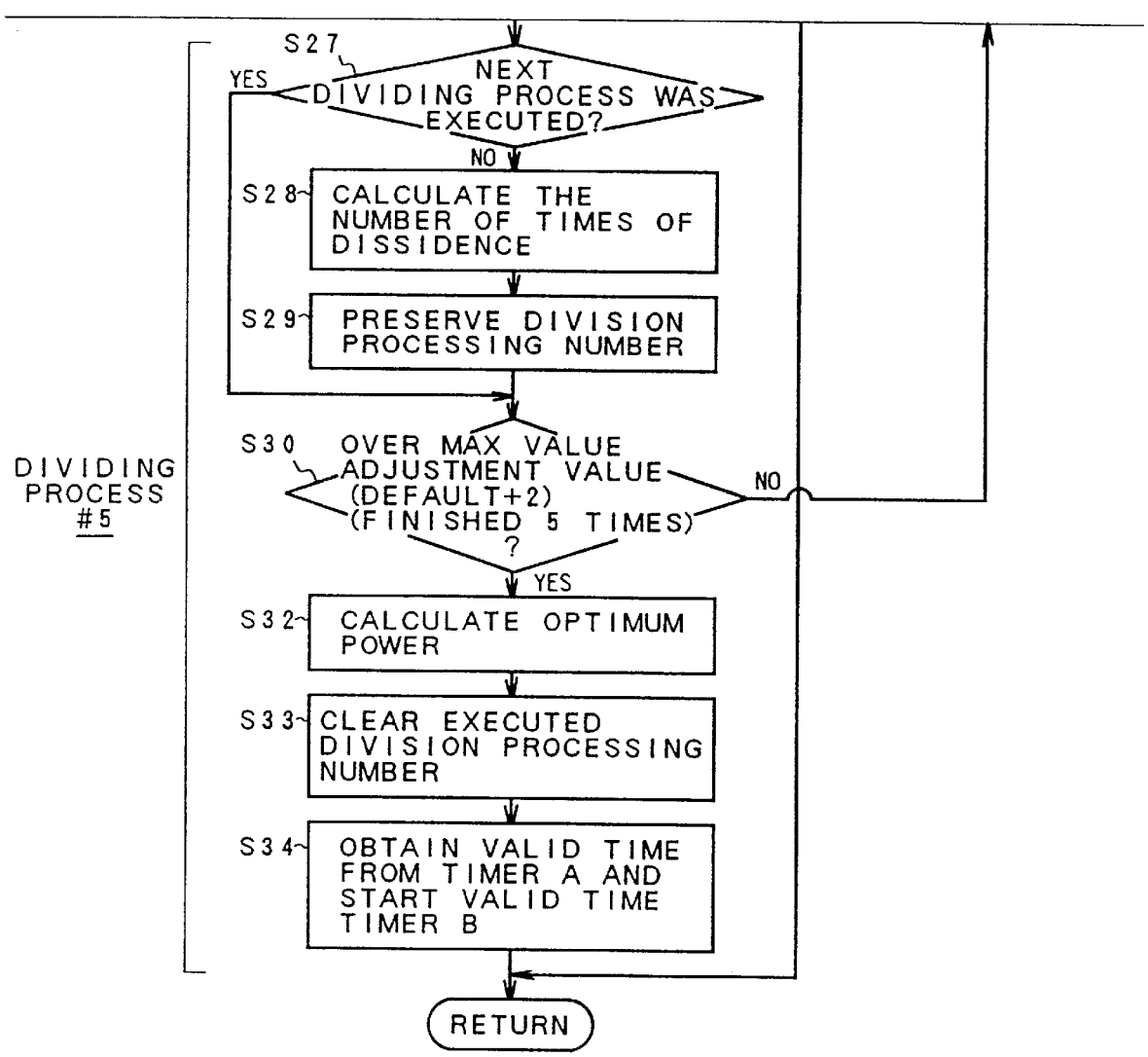
Figure 17:
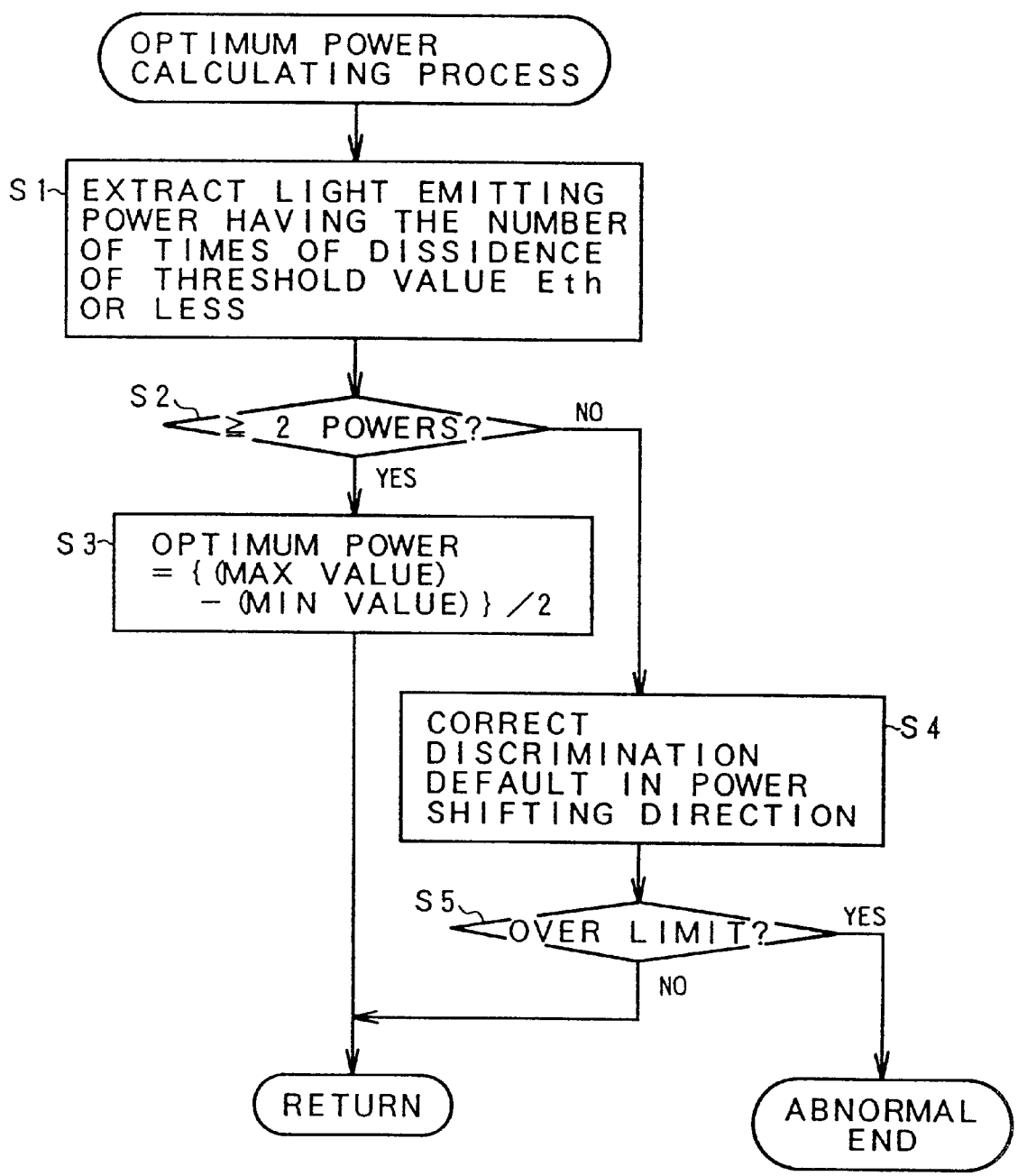
FIG. 17 is a flowchart for a calculating process of an optimum power in FIGS. 16A and 16B.

FIG. 17 shows the calculating process of the optimum power in step S2 in FIG. 16A. Five points of O, P, Q, R, and S showing the number of times of dissidence when the default power DWP which gives, for example, the characteristics 212 in FIG. 10 is changed to (−2, −1, 0, +1, +2) are obtained by the detection result of the number of times of dissidence based on the erasing, writing, and reading processes for five times in which the light emitting power is changed in FIGS. 15A to 16B. Therefore, the number of errors and the threshold value Eth to discriminate the optimum light emitting power are compared in step S1, thereby extracting the light emitting powers having the number of times of dissidence that is equal to or less than the threshold value Eth. In step S2, a check is made to see if there are two or more light emitting powers which give the number of times of dissidence that is equal to or less than the threshold value Eth. When there are two or more light emitting powers, the optimum power is determined as ½ of the difference between the maximum and minimum values of the two powers in step S3. When the number of light emitting powers in which the number of times of dissidence is equal to or less than the threshold value Eth is less than 2 in step S2, namely, when there is only one light emitting power, the optimum power cannot be determined. Therefore, step S4 follows, a power shifting direction is discriminated, and the default is corrected. The power shifting direction of the default in this case is corrected so as to shift the default power by one unit to the light emitting power side in which the number of errors exceeds the threshold value Eth. In step S5, a check is made to see if the corrected default value has exceeded a predetermined limit, namely, the lower limit value or upper limit value of the writing power. If NO, the processing routine is returned to the routine in FIGS. 16A and 16B. If the default power after the adjustment exceeds the limit, the processing routine is finished as abnormality.

Figure 18B:
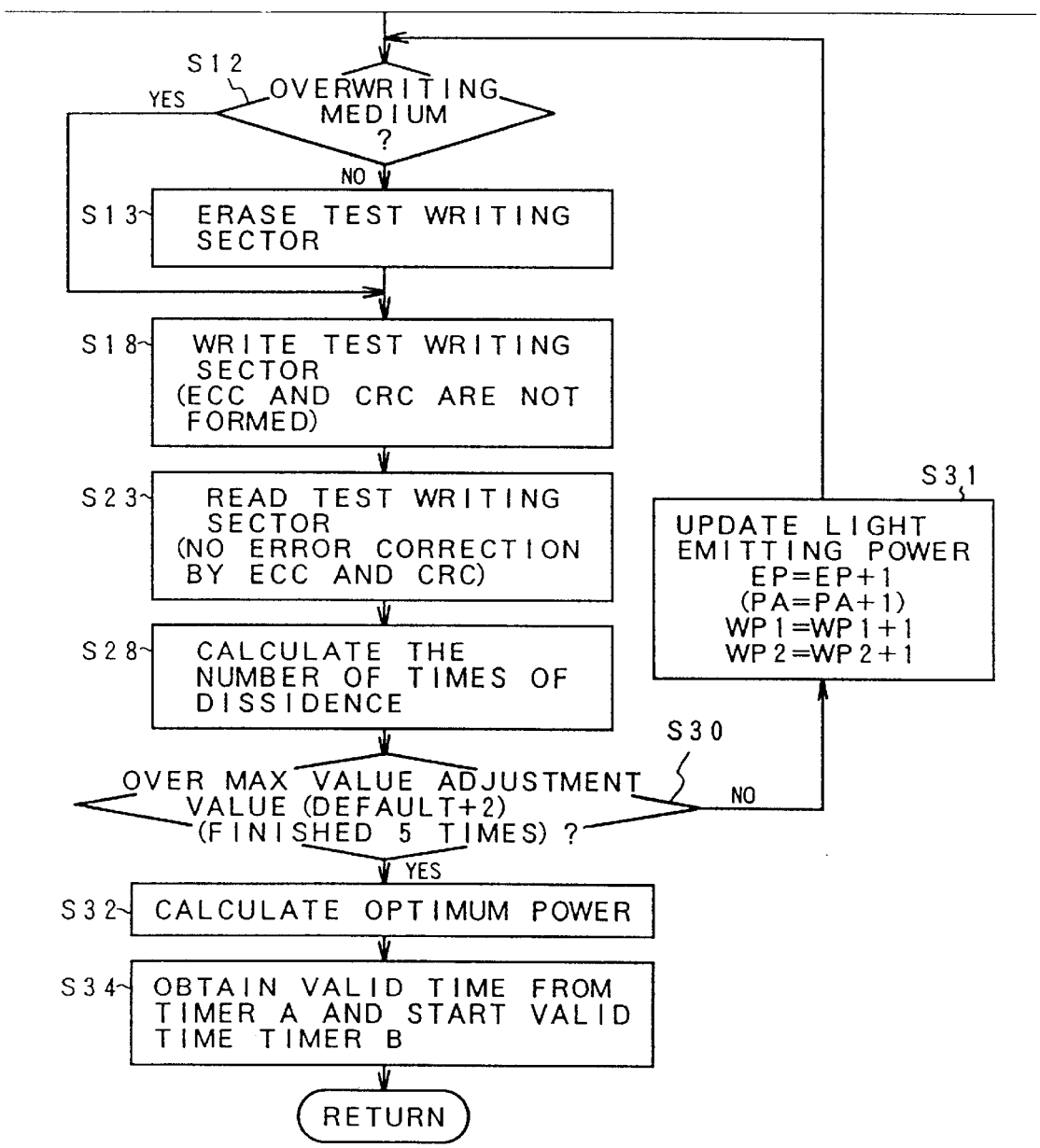

Flowcharts of FIGS. 18A and 18B show the batch test writing process which is executed when the first write command is received and they are shown as a series of flow excluding the portions which are skipped in FIGS. 15A, 15B, 16A, and 16B in a state where the batch execution flag is ON. That is, when the processes in the case where the ON state of the batch execution flag in steps S9, S15, and S25 in FIGS. 15A to 16B is discriminated are extracted, only the processes in steps S1 to S4, S7, S12, S13, S18, S23, S28, S30, S32, and S34 in FIGS. 18A and 18B are executed. The contents of the batch test writing process are similar to those in the corresponding steps in FIGS. 15A to 16B except for a different point that in the area discriminating process of the access track in step S3, since the command is the first write command, the write data patterns which are used for test writing are prepared in the RAM.

FIG. 19 is a flowchart for the test writing process which is based on the temperature change and is shown in step S11 in FIG. 13. As shown in the time schedule of FIG. 7A, the test writing process based on the temperature change is executed for the temperature change test write processing period 206 after the elapse of 160 seconds corresponding to the valid time test write processing time 204 from the medium loading. When the temperature change test writing process is activated on the basis of the write command from the upper apparatus, a check is made in step S1 to see if the apparatus is on the way of the division test writing. That is, whether the division test writing has been interrupted or not is discriminated. When the apparatus is not on the way of the division test writing, step S2 follows and the elapsed time from the previous detection temperature is detected. The elapsed time is obtained by the measurement time (B) of the valid time timer 172. In step S3, whether the elapsed time (B) is equal to or longer than 160 seconds or not is discriminated. When the elapsed time (B) is shorter than 160 seconds, the processes after step S4 are skipped and the processing routine is returned to the main routine in FIG. 13. When the elapsed time (B) is equal to or longer than 160 seconds, step S4 follows and a temperature difference between the previous and present temperatures is calculated. In step S5, whether the temperature difference is equal to or higher than 3° C. or not is discriminated. When the temperature difference is equal to or higher than 3° C., step S6 follows and a check is made to see whether it is equal to or higher than 4° C. or not. When it is less than 4° C., the batch execution flag is turned off in step S7. The processing routine advances to the division test writing process in step S8. The division test writing processes in FIGS. 15A to 16B are executed. When the completion of the test writing is detected in step S9, the new optimum light emitting power is obtained. Therefore, step S10 follows and the elapsed time timer 170 is reset. After that, the valid time timer 172 to measure the elapsed time (B) is reset and started. When it is determined in step SI that the apparatus is on the way of the division test writing, namely, the division test writing has been interrupted, step 511 follows and a temperature difference between the previous and present temperatures with respect to the division execution is calculated. When the temperature change in the interrupting time of the division execution is equal to or higher than 2° C. in step S12, this means that since the temperature change in the division interruption period of time is too large, the results obtained by the division execution so far cannot be validly used. Therefore, the division processing number is cleared in step S13, so that the division test writing process is again executed from the beginning in step S8. When the temperature difference between the previous and present temperatures is equal to or higher than 4° C., namely, when the temperature largely changes in step S6, since there is a possibility that the optimum light emitting power is largely deviated, the processing routine advances to step S14 and the batch execution flag is turned on. The remaining dividing processes are executed in a lump in step S8. The division test writing process in case of turning on the batch execution flag in step S14 becomes the batch test writing process based on the batch execution flag in FIGS. 18A and 18B.

According to the invention as mentioned above, a series of test writing processes accompanied with the erasing, writing, and reading operations when the upper command is received are divided into a plurality of processing stages and are sequentially executed. Even in the case where the apparatus temperature suddenly changes and the optimum power is largely deviated from the default power which was initially set, so that it takes a long time until the end of the test writing process to find the optimum power, the processes are distributed and executed. Consequently, the access in response to the upper command is finished during the interruption of the dividing process of the writing power, so that the error due to the time-out for the upper command is not generated. Even if the power is deviated from the optimum power during the dividing process of the test writing, the recording and reproduction can be executed as much as possible. Thus, the apparatus performance can be improved as a whole.

The above embodiment has been described with respect to the example in the case where each time the write command from the upper apparatus is received, the necessity of the test writing is discriminated and the division test writing process is executed. As another embodiment of the invention, however, it is also possible to construct in a manner such that the valid time Tv is obtained with reference to the valid time table 168 based on the elapsed time (A) by the elapsed time timer 170 from the medium loading in FIG. 7A without depending on the write command and, each time the valid time Tv elapses, the division test writing is divisionally executed for the processing time of every 0.5 second.

With respect to the division test writing process based on the temperature change of the apparatus as well, it is also possible to construct in a manner such that when the apparatus temperature changes by, for example, 3° C. or more, the division test writing process is started and is divisionally executed at every processing period of time of 0.5 second.

With respect to the valid time test write processing period, the valid time corresponding to the elapsed time in the valid time test writing process, and the numerical values of the temperature change in case of discriminating about the necessity of the test writing on the basis of the temperature change which are shown in the above embodiment, proper values can be determined as necessary and the invention is not limited by the numerical values of the embodiment.

Although the above embodiment has been described with respect to the 540-MB medium and 640-MB medium as an example, the division test writing can be also similarly applied to the 230-MB medium. In case of the 230-MB medium, however, as a medium area where the test writing is executed, it is sufficient to set one area with regard to the whole surface of the medium. It is, therefore, unnecessary to divide the medium area into a plurality of areas and to execute the test writing every area like a 540-MB medium or 640-MB medium.

Further, in the test writing of the invention, the changes of the writing power at five stages are formed by adding and subtracting one default unit to/from the default value. However, the changes of the writing power can be also formed by multiplying the default value by predetermined coefficients such as 0.8, 0.9, 1.0, 1.1, and 1.2, respectively.

Moreover, although the invention has been described with respect to the MO cartridge medium which needs the erasing operation and the cartridge medium of the direct overwrite corresponding type which doesn't need the erasing operation as examples, the embodiment of the invention can be also similarly applied to other media such as optical disk of the phase change type and disk of the recording system like a DVD-RAM or the like using a light power.

What is claimed is:

1. An optical storage apparatus comprising:

a light emitting power adjusting unit for adjusting a light emitting power of a laser diode which is used for recording and reproduction of a medium; and a divisional test write processing unit for dividing a test writing process into a plurality of test processes, said test processes being used to determine an optimum light emitting power by executing a test writing on said medium and performing said plurality of test processes in a range from a start of the test writing to an end thereof and for sequentially executing said test processes each time test writing start conditions according to a predetermined time schedule of elapsed times are satisfied.

2. An optical storage apparatus comprising:

a light emitting power adjusting unit for adjusting a light emitting power of a laser diode which is used for recording and reproduction of a medium; and a division test write processing unit for dividing a test writing process into a plurality of test processes, said test processes being used to determine an optimum light emitting power by executing a test writing on said medium and performing said plurality of test processes in a range from a start of the test writing to an end thereof and for sequentially executing said test processes when there is a temperature change of a predetermined value or more and when at least one predetermined time test writing start condition is satisfied.

3. An optical storage apparatus comprising:

a light emitting power adjusting unit for adjusting a light emitting power of a laser diode which is used for recording and reproduction of a medium; and a divisional test write processing unit for dividing a test writing process to determine an optimum light emitting power by executing a test writing on said medium and performing a plurality of test processes and for sequentially executing said test processes in accordance with a predetermined time schedule of elapsed times, wherein said division test write processing unit validly operates and executes said test processes for a period of time until the elapsed time from a predetermined start timing of said apparatus reaches a predetermined time.

4. An apparatus according to claim 3, wherein said division test write processing unit determines an optimum light emitting power by executing the test processes in a lump by a first upper command, sets a valid time for making an adjustment of said optimum light emitting power unnecessary on the basis of the elapsed time until the present time, inhibits the test process for the upper command until the elapse of a time of a predetermined rate of said valid time, and allows the division to be executed for the upper command for said valid time from said predetermined rate time.

5. An apparatus according to claim 4, wherein said division test write processing unit inhibits said test process in a time zone that is less than 90% of said valid time and permits said test process in a time zone exceeding 90% of said valid time.

6. An apparatus according to claim 4, wherein when the elapsed time exceeds said valid time on the way of an execution stage of said test process, said division test write processing unit executes the remaining test processes in a lump by a next upper command.

7. An apparatus according to claim 4, wherein said division test write processing unit sets the valid time so as to be long step by step in proportion to the elapsed time from said start timing.

8. An optical storage apparatus comprising:
a light emitting power adjusting unit for adjusting a light emitting power of a laser diode which is used for recording and reproduction of a medium; and
a division test write processing unit for dividing a test writing process to determine an optimum light emitting power by executing a test writing on said medium and performing a plurality of test processes and for sequentially executing said test processes when there is a temperature change of a predetermined value or more,
wherein said division test write processing unit validly operates and executes said test processes after the elapsed time from a predetermined start timing of said apparatus exceeds a predetermined time.

9. An optical storage apparatus comprising:
a light emitting power adjusting unit for adjusting a light emitting power of a laser diode which is used for recording and reproduction of a medium; and
a division test write processing unit for dividing a test writing process to determine an optimum light emitting power by executing a test writing on said medium and performing a plurality of test processes and for sequentially executing said test processes when there is a temperature change of a predetermined value or more,
wherein said division test write processing unit detects a temperature in the apparatus every predetermined time and allows said test processes to be executed when a as temperature difference between the detected temperature and a previous detection temperature exceeds a predetermined temperature.

10. An apparatus according to claim 9, wherein when said temperature difference exceeds an upper limit temperature that is higher than said predetermined temperature during an executing stage of said test process, said division test write processing unit allows said test processes to be executed in a lump.

11. An apparatus according to claim 10, wherein when the temperature difference between the previous and present dividing processes exceeds said predetermined temperature during the test process, said division test write processing unit cancels the processed numbers and processing results up to the previous time and again executes the test processes from the beginning.

12. An apparatus according to claim 1, wherein said division test write processing unit validly operates and executes said test processes for a period of time until the elapsed time from a predetermined start timing of said apparatus reaches a predetermined time.

13. An apparatus according to claim 12, wherein said division test write processing unit determines an optimum light emitting power by executing the test processes in a lump by a first upper command, sets a valid time for making an adjustment of said optimum light emitting power unnecessary on the basis of the elapsed time until the present time, inhibits the test process for the upper command until the elapse of a time of a predetermined rate of said valid time, and allows the division to be executed for the upper command for said valid time from said predetermined rate time.

14. An apparatus according to claim 13, wherein said division test write processing unit inhibits said test process in a time zone that is less than 90% of said valid time and permits said test process in a time zone exceeding 90% of said valid time.

15. An apparatus according to claim 13, wherein when the elapsed time exceeds said valid time on the way of an execution stage of said test process, said division test write processing unit executes the remaining test processes in a lump by a next upper command.

16. An apparatus according to claim 13, wherein said division test write processing unit sets the valid time so as to be long step by step in proportion to the elapsed time from said start timing.

17. An apparatus according to claim 2, wherein said division test write processing unit validly operates and executes said test processes after the elapsed time from a predetermined start timing of said apparatus exceeds a predetermined time.

18. An apparatus according to claim 2, wherein said division test write processing unit detects a temperature in the apparatus every predetermined time and allows said test processes to be executed when a temperature difference between the detected temperature and a previous detection temperature exceeds a predetermined temperature.

19. An apparatus according to claim 18, wherein when said temperature difference exceeds an upper limit temperature that is higher than said predetermined temperature during an executing stage of said test process, said division test write processing unit allows said test processes to be executed in a lump.

20. An apparatus according to claim 19, wherein when the temperature difference between the previous and present dividing processes exceeds said predetermined temperature during the test process, said division test write processing unit cancels the processed numbers and processing results up to the previous time and again executes the test processes from the beginning.

* * * * *